US009652975B1

(12) United States Patent
Riley

(10) Patent No.: US 9,652,975 B1
(45) Date of Patent: May 16, 2017

(54) INTEGRATED BUILDING OCCUPANT PROTECTION SYSTEM FOR PERSONS AND PETS

(71) Applicant: Thomas R. Riley, Greenwood, SC (US)

(72) Inventor: Thomas R. Riley, Greenwood, SC (US)

(*) Notice: Subject to any disclaimer, the term of this patent is extended or adjusted under 35 U.S.C. 154(b) by 0 days.

(21) Appl. No.: 14/815,996

(22) Filed: Aug. 1, 2015

Related U.S. Application Data

(60) Provisional application No. 62/032,105, filed on Aug. 1, 2014, provisional application No. 62/053,130, filed on Sep. 20, 2014.

(51) Int. Cl.
*G08B 29/14* (2006.01)
*G08B 21/02* (2006.01)

(52) U.S. Cl.
CPC .............. *G08B 29/14* (2013.01); *G08B 21/02* (2013.01)

(58) Field of Classification Search
CPC ................... G08B 29/14; G08B 21/02
USPC .......................................................... 340/514
See application file for complete search history.

(56) References Cited

U.S. PATENT DOCUMENTS

2008/0291036 A1\* 11/2008 Richmond ............. G08B 17/10
340/628

\* cited by examiner

*Primary Examiner* — Leon Flores
(74) *Attorney, Agent, or Firm* — Charlotte C. Wilson

(57) ABSTRACT

An integrated building occupant protection system includes alarm units having a controller, one or more sensors, a timer, a transceiver, an audio alert device, and a communication device. When a sensor detects a threat, the audio alert device is activated. The transceiver transmits an event signal to mobile devices associated with the building occupants. The controller uses response signals from those devices to pinpoint the location of the occupants, which may be broadcast by the communication device. The mobile devices may be cellular telephones or pet collar devices. The system is configured to perform periodic self-tests. A system for generating revenue by selling promotional time following the system tests is also provided.

19 Claims, 16 Drawing Sheets

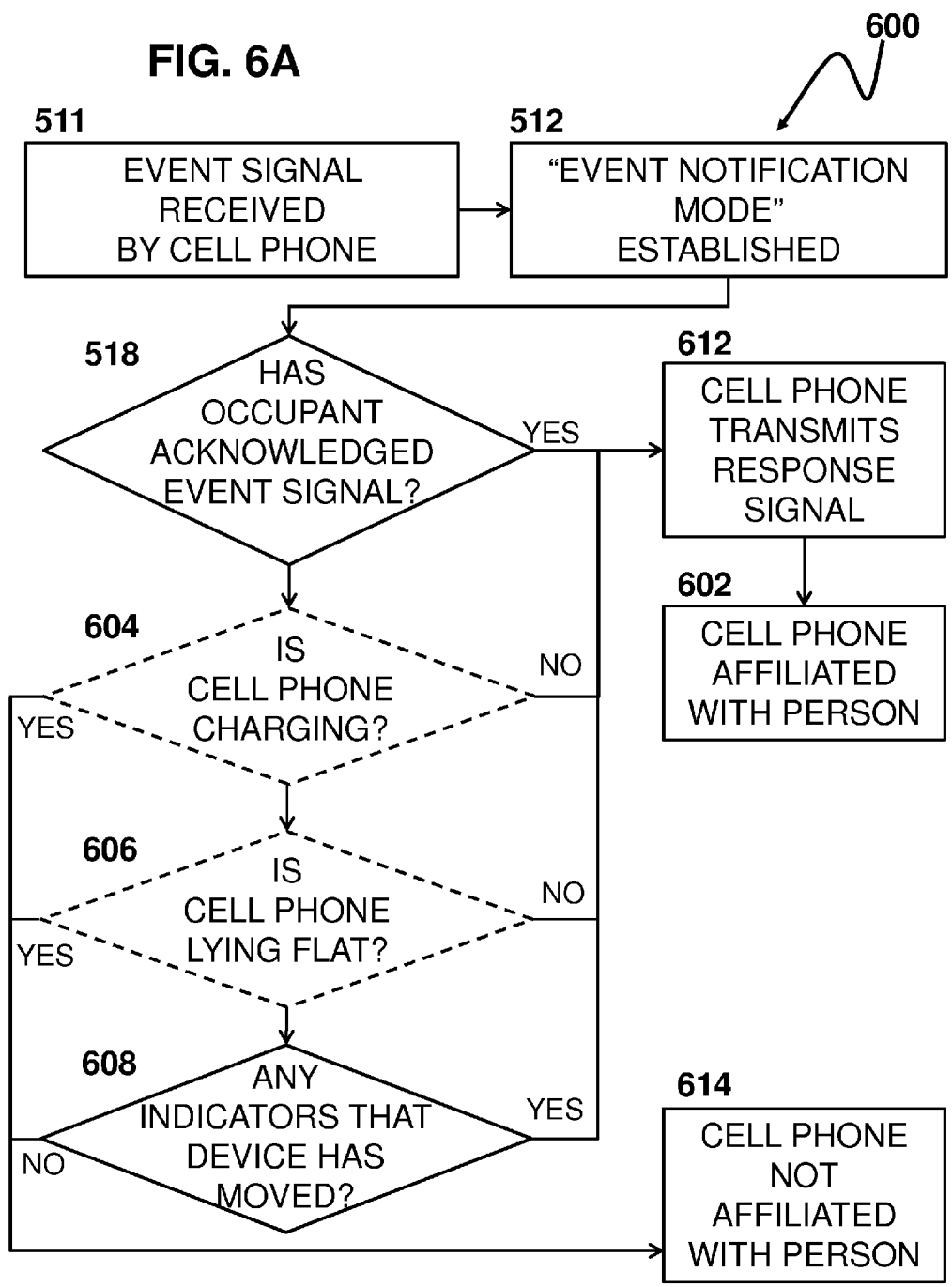

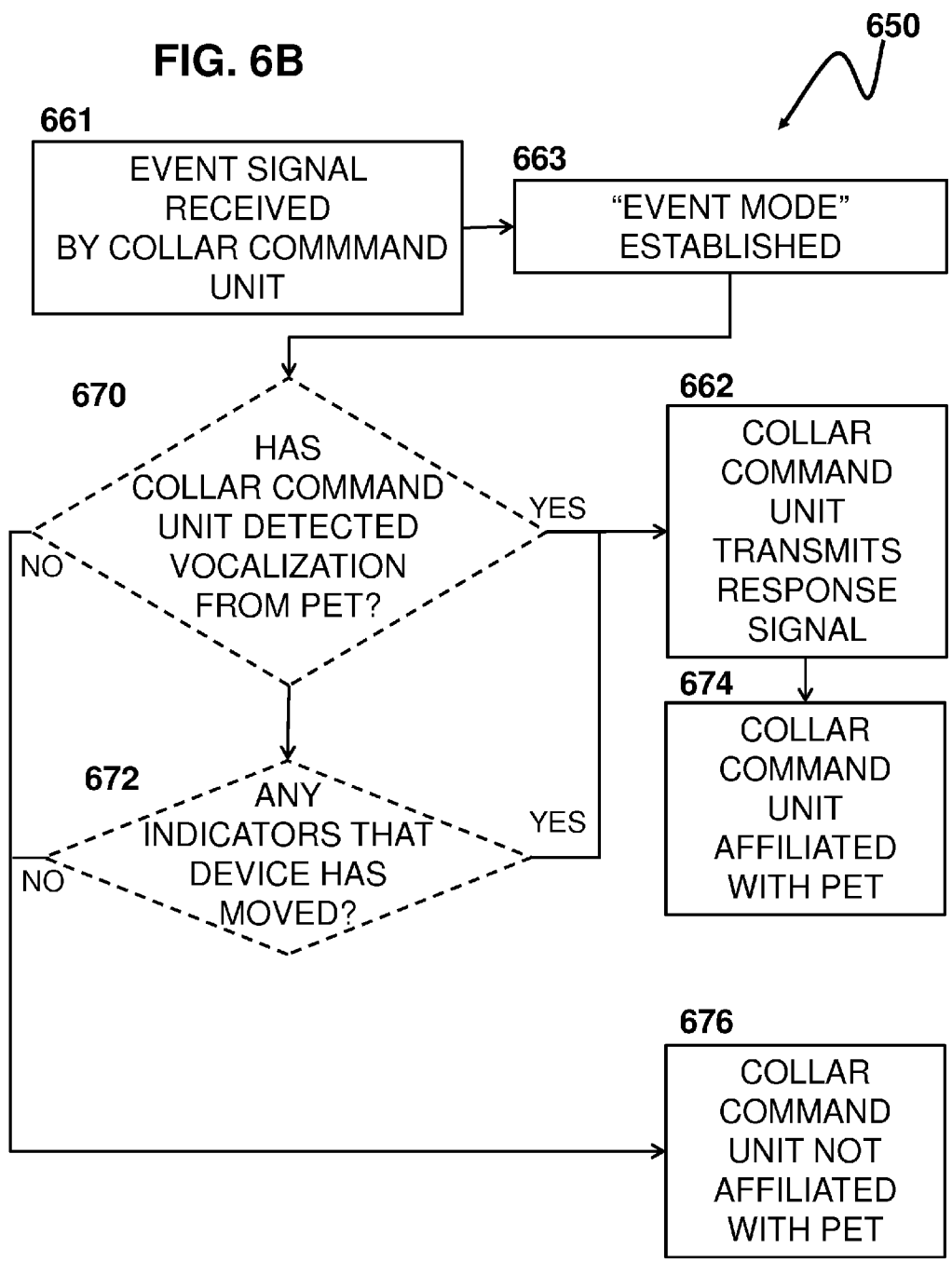

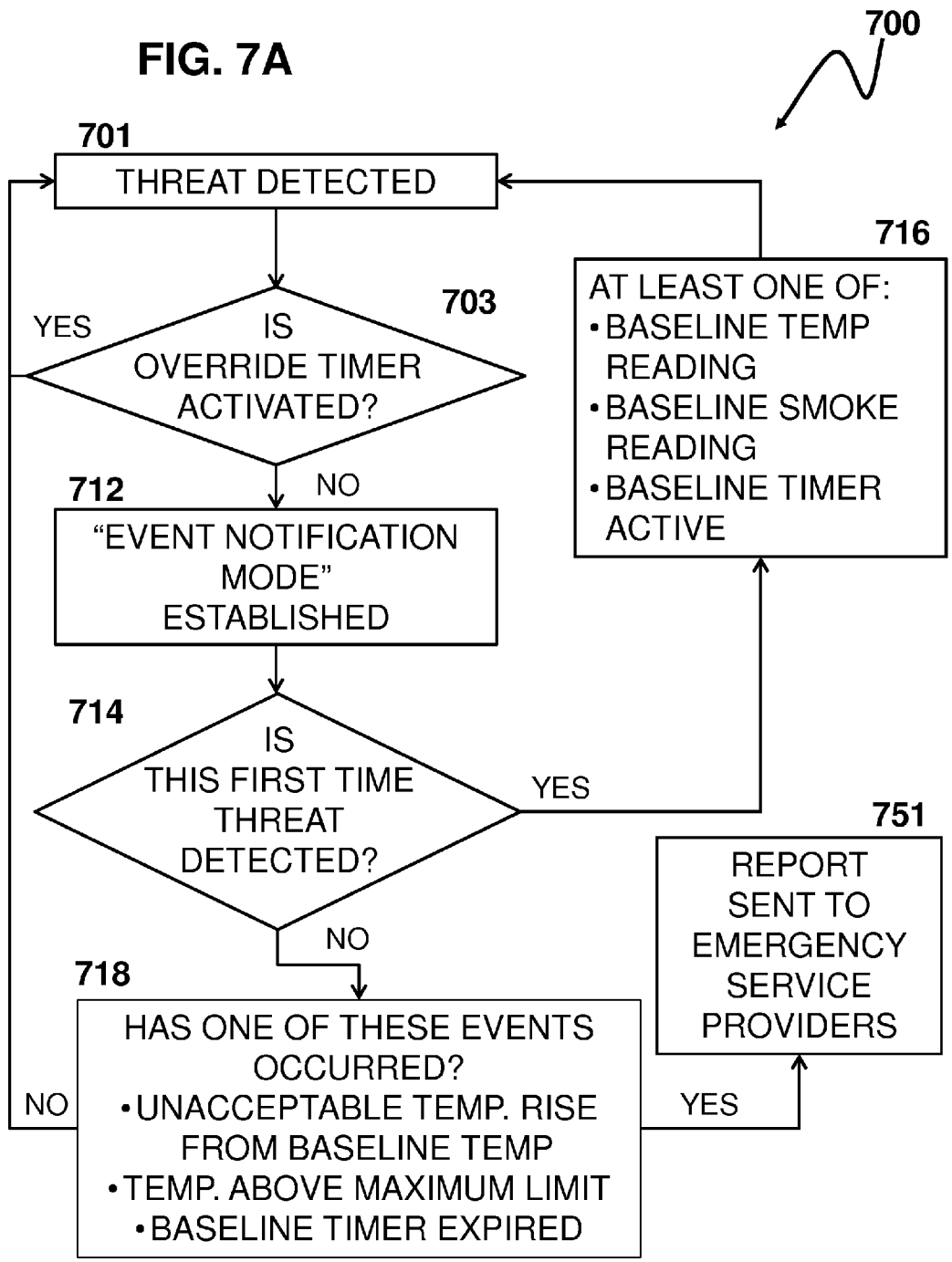

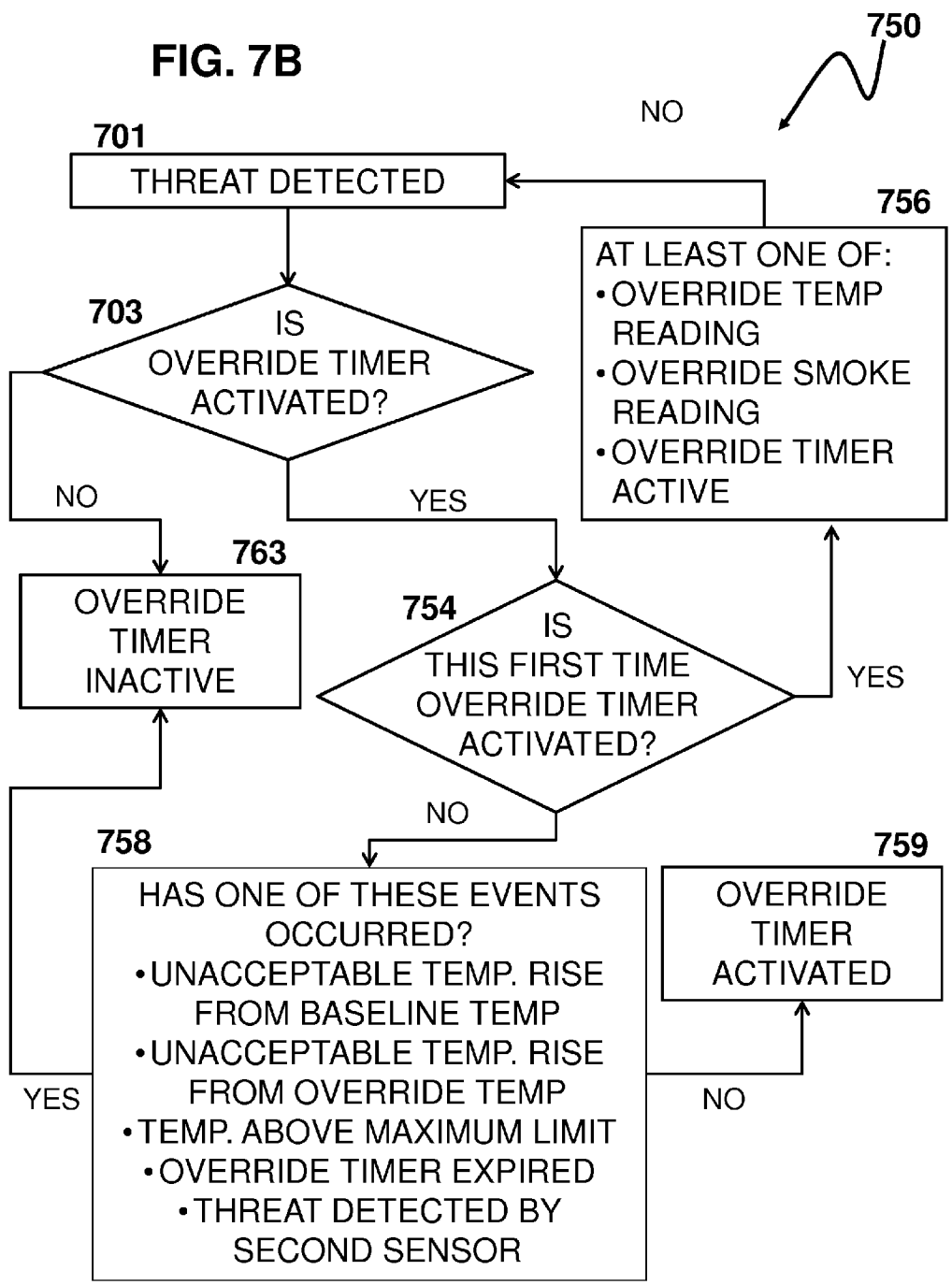

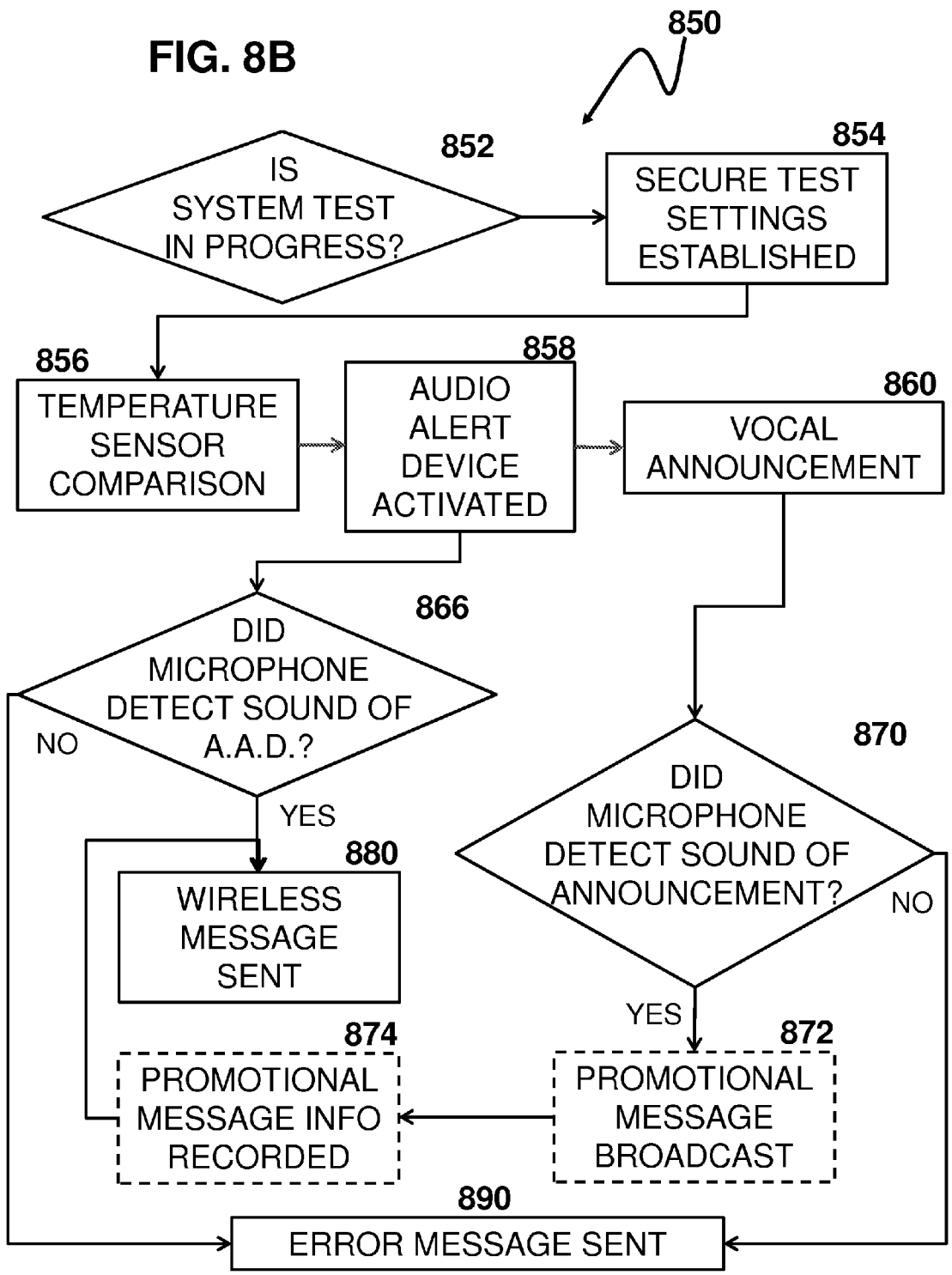

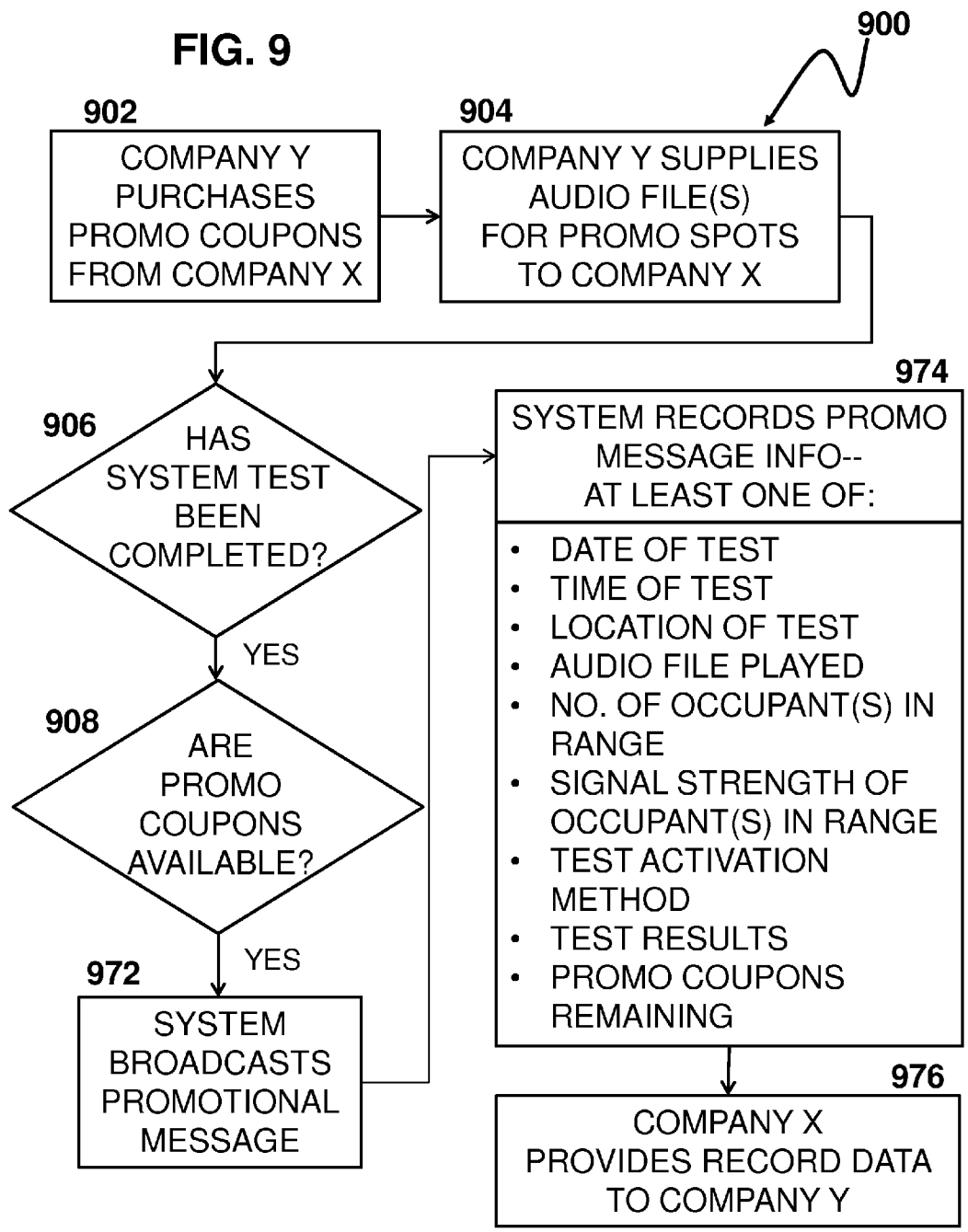

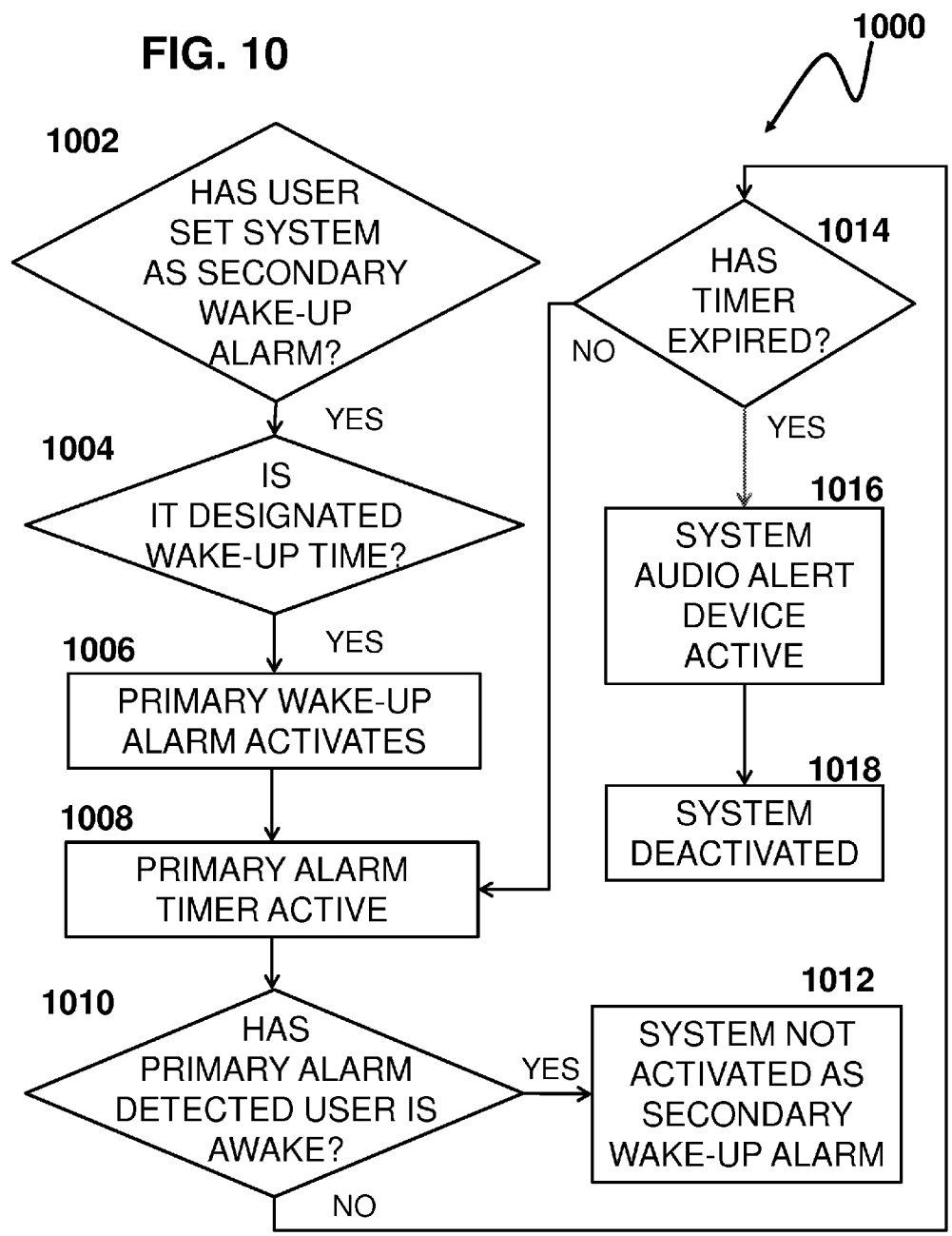

INTEGRATED BUILDING OCCUPANT PROTECTION SYSTEM FOR PERSONS AND PETS

CROSS-REFERENCE TO RELATED APPLICATIONS

This non-provisional patent application claims the benefit of U.S. Provisional Application Ser. No. 62/032,105, filed on Aug. 1, 2014, and U.S. Provisional Application Ser. No. 62/053,130, filed on Sep. 20, 2014, both of which are entitled "Integrated Building Occupant Protection System for Persons and Pets," the entirety of the prior disclosures being incorporated by reference herein.

TECHNICAL FIELD

The present disclosure is directed to an integrated building occupant protection system, where the building occupants include humans and/or pets. The integrated building occupant protection system includes an alarm within the building, a cellular telephone owned by a human occupant, and, in the case of a pet, an interactive collar device worn by the pet. These major components are communicative with each other in the event of an emergency or threat, which permits location and tracking of the building occupants. In one embodiment, the building occupant protection system also communicates with third parties, such as a building monitoring company or local emergency service providers, including a fire department or a police department.

BACKGROUND

Currently, building occupants use alarms mounted or hung inside their homes to identify and to indicate various types of emergencies, such as fire, smoke, and dangerous levels of carbon monoxide or radon. Some of these alarms are capable of detecting multiple threats. In the most basic installation, conventional alarm systems provide one-way communication: the alarm produces an audible signal (typically, a loud siren) heard by the human occupant, and the occupant responds appropriately, for example, by leaving the home.

More advanced home protection systems integrate the alarm units within a building with an off-site professional monitoring service. With such a third-party monitoring service, the activation of the alarm triggers an inquiry by the monitoring service and, if necessary, a call to emergency service providers (e.g., the local fire department). To secure these protective services, the building occupants must pay a monthly premium. These services are primarily concerned with the protection of the building and its human occupants. Thus, one objective of the present disclosure is to provide a building occupant protection system that requires no monthly premiums to summon emergency services, if needed.

Many households have domesticated animals, such as dogs and cats, as pets. These pets may live indoors, outdoors, or both. In some instances, the pet may wear a collar that confines its movements to a certain geographic perimeter. This functionality, which may be implemented by means of buried perimeter fences or other means, is referred to herein as "perimeter control." Perimeter control prevents the pet from roaming into unsafe areas, such as the street, where the pet could become injured. Perimeter control may also be used to confine the pet's movements to a certain area of a yard (for example, away from a garden or pool).

More than just providing perimeter control, a commercially available product called the "TAGG THE PET TRACKER®" provides a service for tracking the location of a pet through a GPS chip on its collar. For a monthly service fee, the pet's location is communicated to the owner's cellular telephone, and the service can provide specific information on the pet's whereabouts and/or activity level. However, the collar must be removed with regular frequency to recharge the battery. Moreover, the GPS chips in these collars work best when the pet is outside the home, which is not usually the case for pets that are primarily kept indoors.

While owners want to keep their pets safe, pets (particularly dogs) feel a similar loyalty to their owners. Pets can provide owners with a sense of security, since even dogs with no special training can function as "watchdogs." Specifically, dogs have a desire to protect their owners and often exhibit a tendency to warn them (by barking) in the event of an emergency, such as an intruder or a fire.

Some pets have a greater sense of threats to their owners or become lonely in their owner's absence, causing them to bark repeatedly. In these cases—especially when the home has nearby neighbors—the pet owner may train his pet to bark less often by using a collar with a behavior correction mechanism, such as a collar that provides small electric shocks when barking is detected. Other types of collars may provide other disincentives (i.e., by spraying bad-smelling liquids), when the pet exhibits a behavior that owners wish to correct. As referenced herein, such collars will be referred to as including "behavior control features."

One commercially available product called the iPETS® mobile device dog trainer allows owners to use their cellular telephones or tablets to control the vocal communication discourager via a Bluetooth® connection. Additionally, the iPETS® training system can be used for perimeter control, by notifying the owner of the pet's location outside a preset perimeter and by applying a behavior correcting stimulus to the pet. Unfortunately, there is no interaction between this collar and a home alarm system, which identifies a threat.

If multiple occupants (including pets) are present in the home at the time of the emergency, valuable time may be lost, while one person searches for the other occupants. Thus, another objective of the present disclosure is to provide a building occupant protection system in which a human occupant may relay, or broadcast, his voice through the alarm(s) of the system to notify other occupants of the need to evacuate. Yet another objective of the present disclosure is to provide a building occupant protection system, which utilizes devices associated with the human and/or animal occupants create two-way communication between the system and the devices, thereby allowing the system to determine the occupants' locations and to assess the likelihood of the devices being in the immediate possession of the occupants. A still further objective is to provide a system that broadcasts or announces the location of the human and/or animal occupants, once determined, thereby facilitating their rescue by other occupants or first responders.

While traditional alarm systems use primarily audible sirens or noises to notify the building occupants of a threat, other alarm systems that rely on visual cues (such as flashing lights from the alarm units) have been created for persons who are deaf or hearing-impaired. Some alarms include a transmitter that communicates with a keychain or other small hand-held device, which includes a receiver. These products are not wholly satisfactory or practical for each circumstance, particularly in situations where one occupant may have hearing challenges and other occupants may not.

A building occupant protection system that communicates in a variety of ways with all of the human occupants would be useful. Thus, an objective of the present disclosure is to provide a building occupant protection system that employs audible signals and visual signals, as well as verbal status reports and direct communications between the system and a device (such as a cellular telephone) associated with the building occupant. A further objective of the present disclosure is to provide a building occupant protection system that a human occupant can override, in the event of a nuisance alarm.

Traditional alarm systems often lack the sophistication to determine when a nuisance threat has escalated into a major threat to the safety of the building occupants. For example, toast crumbs in a toaster may produce smoke, which, when detected by an alarm unit, may be considered a nuisance. However, if the crumbs catch fire, and the fire spreads from the toaster oven throughout the kitchen, a major threat arises. Thus, an objective of the present disclosure is to provide a building occupant protection system that is capable of summoning emergency service personnel, if not manually overridden. A further objective of the present disclosure is to provide a building occupant protection system that is capable of detecting an escalating threat and summoning emergency service personnel, even if the human occupants have previously chosen to override the alarm.

One challenge with many traditional alarms that operate primarily on battery power is the need for the occupants to test the system and to periodically replace the battery. Thus, an objective of the present disclosure is to provide a building occupant protection system in which the system is capable of performing a self-test. Yet another objective of the present disclosure is to provide a building occupant protection system, which allows the human occupant to temporarily postpone the system test to a more convenient time.

These and other objects of the present building occupant protection system will be apparent from a review of the following detailed description and the appended drawings.

SUMMARY

An integrated building occupant protection system includes alarm units having a controller, one or more sensors, a timer, a transceiver, an audio alert device, and a communication device. When a sensor detects a threat, the audio alert device is activated. The transceiver transmits an event signal to mobile devices associated with the building occupants. The controller uses response signals from those devices to pinpoint the location of the occupants, which may be broadcast by the communication device. The mobile devices may be cellular telephones or pet collar devices. The system is configured to perform periodic self-tests. A system for generating revenue by selling promotional time following the system tests is also provided.

In one embodiment, the present disclosure is directed to an integrated building occupant protection system for protecting occupants of a building, which includes a plurality of interconnected alarm units. Each alarm unit is located in a different area of the building. Each alarm unit includes a controller; and, coupled to the controller, a threat sensor to detect a threat, a timer, an audio alert device, a communication device, and at least one noise sensor to detect sound from the audio alert device and the communication device. The protection system conducts a self-test, which including one or more of the following actions: (i) at least two threat sensors are prompted by the controller to measure the temperature in respective areas of the building, the temperatures measured by the at least two threat sensors being compared with each other; (ii) the audio alert device is activated by the controller; and (iii) the communication device is activated by the controller.

In another embodiment, the present disclosure is directed to a system for generating revenue using an integrated building occupant protection system for protecting occupants of a building. The system includes a computer network containing a record of promotional coupons purchased by a third party, a record of promotional coupons broadcast on behalf of the third party, and an audio file used in the broadcast for the third party. The system further includes an integrated building occupant protection system having a plurality of interconnected alarm units. Each alarm unit is located in a different area of the building. Each alarm unit includes a controller; and, coupled to the controller, a threat sensor to detect a threat, a timer, an audio alert device, a communication device, and a communication circuit. The building occupant protection system conducts a test, including one or more of the following actions: (i) at least two threat sensors are prompted by the controller to measure the temperature in respective areas of the building, the temperatures measured by the at least two threat sensors being compared with each other; (ii) the audio alert device is activated by the controller; and (iii) the communication device is activated by the controller. Upon successful completion of the test, (a) the controller queries the computer network to obtain the audio file; (b) the computer network determines if the record of promotional coupons purchased is greater than the record of promotional coupons broadcast, and, if so, provides the audio file to the alarm unit, via the communication circuit; and (c) the controller prompts the communication device to broadcast the provided audio file.

In another embodiment, the present disclosure is directed to an integrated building occupant protection system for protecting occupants of a building, which includes a plurality of interconnected alarm units. Each alarm unit is located in a different area of the building. Each alarm unit includes a controller; and, coupled to the controller, a threat sensor to detect a threat, a timer, an audio alert device, and a communication device. The system also includes at least one device for locating the building occupants, the locating device being in communication with at least one alarm unit. When the threat sensor detects a threat, the controller activates the audio alert device. The communication device periodically interrupts the audio alert device to vocally broadcast a situation report, which includes at least one of the type of threat sensed, a number of building occupants inside the building, the species of the building occupants, a location of each of the building occupants, and a countdown of time remaining in the period measured by the timer.

BRIEF DESCRIPTION OF THE DRAWINGS

A full and enabling disclosure of the present products and methods, including the best mode thereof, directed to one of ordinary skill in the art, is set forth in the specification, which makes reference to the appended figures, in which:

FIG. 6A is an exemplary flow diagram, which illustrates the steps taken by the present building occupant protection system to determine the likelihood of a device being affiliated with the human occupant during the event notification mode;

FIG. 6B is an exemplary flow diagram, which illustrates the steps taken by the present building occupant protection system to determine the likelihood of a device being affiliated with a pet during the event notification mode;

FIG. 7A is an exemplary flow diagram, which illustrates the steps taken by the present building occupant protection system to automatically summon emergency services personnel;

FIG. 7B is an exemplary flow diagram, which illustrates the steps taken by the present building occupant protection system to automatically summon emergency services, even after the human occupant has activated an override function;

FIG. 8B is an exemplary flow diagram, which illustrates further steps taken by the present building occupant protection system during a self-test;

FIG. 9 is an exemplary flow diagram, which illustrates the steps taken by an alarm service supplier of the present building occupant protection system to generate additional revenue via promotional messages played in conjunction with the system test of FIG. 8B; and FIG. 10 is an exemplary flow diagram, which illustrates the steps taken by the human occupant to utilize the present building occupant protection system as a secondary wake-up system.

Figure 1A:
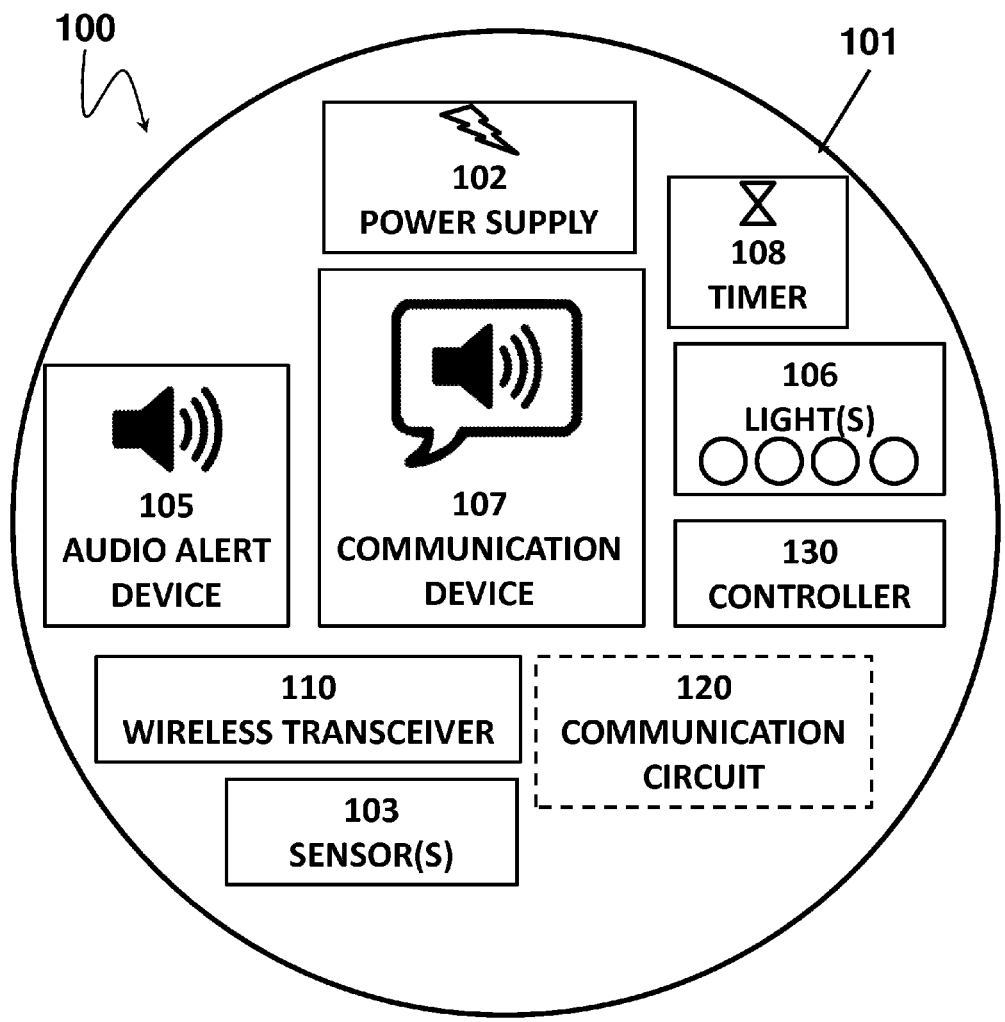
FIG. 1A is a schematic block diagram of an alarm unit as may be used with a building occupant protection system, according to a first aspect of the present disclosure.

Elements and steps in the Figures are illustrated for simplicity and have not necessarily been rendered according to any particular embodiment or sequence, unless otherwise specified in the claims.

DETAILED DESCRIPTION

Reference will now be made in detail to embodiments of the inventive products and methods, one or more examples of which are illustrated in the drawings. Each example is provided by way of explanation of the invention, not limitation of the invention. In fact, it will be apparent to one of ordinary skill in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as fall within the scope of the appended claims and their equivalents.

The problems with existing alarm systems in protecting human and pet occupants are described in the Background section. In the event of an emergency, when time is critical, a building occupant protection system communicates with the building occupant in multiple manners, including audio signals, vocal communications, lights, vibration, and/or written communication.

In some embodiments, when necessary, the building occupant protection system may communicate with a local emergency services provider or a third-party monitoring system. In at least one embodiment, the alarm communicates directly with a local emergency services provider without the use of a third-party monitoring company.

In at least one embodiment, the building occupant protection system includes an alarm that communicates with the cellular telephone associated with the human occupant. In one or more embodiments, the human occupant may use his cellular telephone, in conjunction with the building occupant protection system, to broadcast his voice through the building. In one or more embodiments, the alarm may receive transmissions from the cellular telephone of the human occupant, either as instructions or as indicators of the location of the human occupant within the building.

In another embodiment, the building occupant protection system includes an alarm that communicates with a collar command unit worn by a pet. In one or more embodiments, the alarm may receive transmissions from the collar command unit of the pet, which are indicators of the location of the pet. In some embodiments, the collar command unit may be provided with, or associated with, a behavior-deterring feature, which may be overridden by transmissions from the alarm. More details about the collar command unit and its operation may be learned from a review of U.S. patent application Ser. No. 14/815,960, entitled "Behavior-Deterring Collar with Emergency Override," filed concurrently herewith, the disclosure of which is hereby incorporated by reference herein in its entirety.

The alarm may have lights incorporated therein, and/or the cellular telephone may include an application that produces a visual display (displayed message, text message, flashing lights, vibration, etc.) to alert human occupants. Such alert communications may be particularly useful for alerting human occupants who are deaf or hearing-impaired.

In these or other embodiments, an alarm of the building protection system includes a timer that provides a prescribed interval during which the human occupant can disarm the alarm before the system summons help.

Additionally, because protection devices are only effective if they are functioning correctly, the alarm of the building occupant protection system includes a self-testing protocol. The building occupant protection system may include a timer that determines the scheduling of a system test or may include a communication circuit that accesses a timer function on the internet. In connection with this embodiment, the system may communicate the results of the self-test to the human occupant, thereby increasing the human occupant's confidence in the system's readiness to perform in the event of an emergency.

In further connection with the self-testing embodiment, the human occupant may employ a delay period for temporarily postponing the system test. In one or more embodiments, the system test may include promotional messages that a third party company has purchased from the manufacturer or distributor of the building occupant protection system.

In another embodiment, the building occupant protection system may be employed as a secondary wake-up system.

Integrated building occupant protection systems addressing the needs described above are provided herein and will be discussed in detail with reference to the Figures.

FIG. 1A is a schematic block diagram of an alarm unit 100 as may be used with a building occupant protection system, according to a first aspect of the present disclosure. The components of the alarm unit 100 are contained within a housing 101. The components may be coupled either directly or indirectly to one another.

Figure 1B:
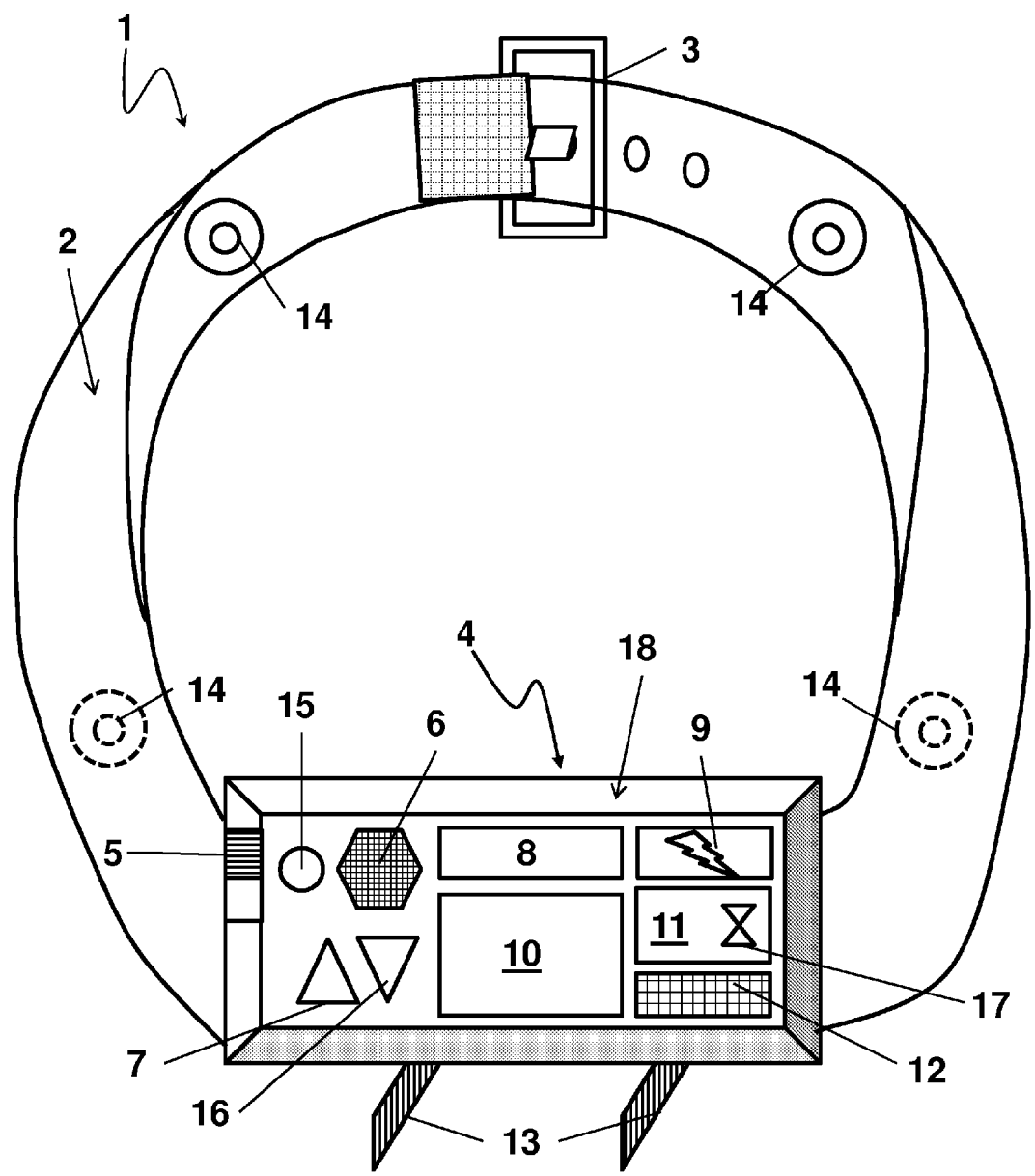
FIG. 1B is a schematic perspective view of a pet collar having a collar command unit, according to an aspect of the present disclosure.

FIG. 1B is a schematic illustration of a collar having a collar command unit attached to, or incorporated therein, according to another aspect of the present disclosure. The components of the collar command unit 4 are contained within a housing 18. The components may be coupled either directly or indirectly to one another.

As used herein, the terms "connect", "connected", "connecting", "couple", "coupled", "couples", "coupling", and the like should be broadly understood as referring to the connection between two or more elements or signals, whether electronically, mechanically, or otherwise. Two or more electrical components may be electrically coupled or connected, but may not be mechanically or otherwise coupled or connected. Two or more mechanical components may be mechanically coupled or connected, but may not be electrically or otherwise coupled or connected. Two or more electrical elements may be mechanically coupled or connected, but may not be electrically or otherwise coupled or connected. Coupling or connecting may be for any length of time, including permanent, semi-permanent, or momentary.

Because many of the components of the alarm unit 100 and the collar command unit 4 are similar, these components will be discussed below in parallel with simultaneous reference to FIGS. 1A and 1B.

Housing:

The housings 101, 18 provide a structure for containing the components of the alarm unit 100 and the collar command unit 4, respectively. The structure may have any three-dimensional shape, such as a rectangular prism, a cube, or a cylinder, which has a size adequate to dispose the various components therein. The housing 18, 101 may be constructed of any suitable material, such as plastics, metals, natural fibers, wood, or glass. The housing 18, 101 may also be constructed of multiple types of material. In one embodiment, the housing 18, 101 may have an exterior surface that is plastic and one or more interior surfaces that are metal. In one embodiment, the housing 18, 101 may have a circular or a rectangular profile, although other shapes may instead be used.

In at least one embodiment, the interior of the housing 18, 101 may be configured to provide mounting locations for the various components of the device. In the case of the alarm unit housing 101, an interior surface may be configured to provide locations for the mounting of the alarm unit 100 to a building surface, such as a wall or ceiling. In the case of the collar command unit housing 18, an exterior surface may be configured to provide locations for mounting of the collar command unit 4 to a collar strap 2.

Power Supply:

A power supply 9, 102 within the housing 18, 101 may be electrically connected to any or all of the components within the housing 18, 101. In the case of the alarm unit 100, the power supply 102 may be wired to an electrical system of a building in which the alarm unit 100 is installed; may be a battery, which is replaceable or rechargeable; or may include both a wired connection and a battery, in which case the wired connection is the primary power supply, and the battery is a back-up, or auxiliary, power supply. In yet another embodiment, the power supply 102 receives electricity wirelessly or via a USB connection to a computer.

While shown as being a component within the housing 101, the power supply 102 may instead be an external power source. The external power source may provide the power for the alarm unit 100, via an AC-to-DC adapter or a battery. The adapter (not shown) may be connected to the alarm unit 100 by conventional means, such as by plugging a 2.1 mm center-positive plug into a power jack on a circuit board. Leads from a battery can be inserted into the Gnd and Vin pin headers of the POWER connector.

In the case of the collar command unit 4, the power supply 9 is preferably a battery and, in some cases, is a battery that may be rechargeable. In some instances, the power supply 9 may be wirelessly rechargeable. The power supply 9 may be coupled to an on/off switch 5.

Each mobile device 220, 4 is provided with at least one of the following unique identifiers: a Media Access Control (MAC) address, a Service Set Identification (SSID), or an Internet Protocol (IP) address. Additionally, the building occupant 210 may assign a device name to the mobile device 220, 4 to affiliate the unique identifier with the type of device and the building occupant normally in possession of the mobile device 220, 4. For example, the building occupant 210 may assign his cellular telephone 220 with a device name, such as "Jack's iPhone," and may assign the collar command unit 4 with another device name, such as "Fido's Collar."

In one embodiment, each mobile device 220, 4 is provided with a MAC address, which is imprinted onto a network card in a read-only format. The MAC address includes, or is formatted to indicate, the type of device to which the MAC address is assigned.

IP addresses are numerical labels assigned to each device (e.g., cellular telephone, computer) participating in a computer network that uses the internet protocol for communication. An IP address serves two principal functions: host or network interface identification and location addressing. When a new mobile device connects to an internet modem for the first time, the internet modem assigns that new device its own unique IP address, which permits the mobile device to automatically link to the network and, therefore, the internet. Based on that IP address, the modem easily recognized when a mobile device is connected to it (that is, in range of its signal). Because two different modems will likely give the same device different IP addresses, IP addresses are not as universal as MAC addresses.

Controller:

A controller 11, 130 within the housing 18, 101 may be electrically connected to any or all of the components within the housing 18, 101. In a preferred embodiment, the controller 11, 130 is coupled to all of the components in the housing 18, 101. In an alternate embodiment, the controller 11, 130 is coupled to most of the components in the housing 18, 101. In yet another embodiment, the controller 11, 130 may employ software to control the functions of components within the housing 18, 101 without the need for physical connections.

The components of the controller 11, 130 may include devices such as chips, boards, integrated circuits, processors, memory, GPUs, CPUs, microcontrollers, or any combination of these devices. One particular example of a controller for the alarm unit 100 is commercially available from ARDUINO® under the name "MEGA 2560."

The components of the controller 130 may be configured in any suitable manner to interface with, or manage, the operation of coupled devices to perform a number of specialized functions. In the alarm unit 100, the coupled devices may include sensors 103, an audio alert device 105, a light 106, a communication device 107, a timer 108, a wireless transceiver 110, and, optionally, a communication circuit 120. Transmitters, receivers, Subscriber Identification Module (SIM) cards, and other electronic components may optionally be incorporated into the housing 101, in addition to or instead of any of the components illustrated. In the collar command unit 4, the coupled devices may include sensors, a receiver, a transmitter, hazard detectors, a light, a tracking chip, a behavior-deterring stimulator 13, and a counting mechanism (which is either incorporated into the controller 11 or a separate device).

The controller 130 may include a memory device or component (not shown separately). For example, the memory device may be a Secure Digital (SD) memory card or other flash memory. The memory device may incorporate a read-only feature, a write-only feature, or both read-and-write features. In some instances, it may be desirable to include multiple memory devices, one of which is read-only and one of which is write-only.

In one embodiment, when the alarm unit 110 is powered on, the controller 130 scans the memory device for data. If the data is incorrect or incomplete, the controller 130 prompts the communication device 107 to deliver an error message to the building occupant 210. The building occupant 210 may be instructed to remove the memory device (e.g., SD card) and insert the memory device into a computer to obtain the correct or complete data files. The data files may include information on the location (particular floor and room) within the building where the alarm unit 100 is installed, as well as the physical location (address) of the building. The building occupant 210 then re-inserts the memory device into the alarm unit 110 and powers on the unit 110, causing the alarm unit 100 to connect wirelessly to the internet connection of the building (e.g., through the communication circuit 120). Other uses and functions of the memory device are discussed further herein.

Stimulator:

In one embodiment of the collar command unit 4, the collar 1 or collar command unit 4 includes a stimulator 13 that delivers a deterrent stimulus when sensors (6 and/or 14, discussed below) detect a behavior that is undesirable or when a tracking chip 12, as part of a perimeter control system, detects a straying behavior that is undesirable. Although illustrated in FIG. 1B as prongs that deliver an electric or static shock to the pet 260, the behavior-deterring stimulator 13 may alternately or additionally include one or more of: (a) a mechanism that sprays or releases non-toxic chemicals, such as scented chemicals; (b) a noisemaker that produces a warning or unpleasant sound that is audible to the pet 260 (e.g., at a frequency heard by a pet 260, but not necessarily a human); (c) a mechanism that produces vibrations that are felt by the pet 260; (d) a mechanism that produces light (e.g., a flashing light) in a spectrum visible to the pet 260; and (e) a mechanism that clamps or asserts pressure onto the skin of the pet 260.

It should be understood that the scope of the present disclosure is not limited to any particular type of inhibiting stimuli. For example, the inhibiting stimuli may include sounds that are too high in pitch for humans to hear or odors to which a pet is particularly sensitive.

In one aspect, a pet owner or trainer employs a user interface 10 on the collar command unit 4: (a) to enable and disable the behavior-deterring feature; (b) to enable and disable one or more sensors (6, 12, 14) that determine if the undesirable behavior is being exhibited by the pet 260; (c) to enable and disable the stimulator (e.g., 13) that delivers the correctional stimulus to the pet 260 for exhibiting the behavior; and/or (d) to adjust the level of deterrent stimulus applied to the pet 260 for exhibiting the behavior.

Alternately, or additionally, a pet owner or trainer uses a wireless signal from a separate device, such as a cellular telephone application: (a) to enable and disable the behavior-deterring feature; (b) to enable and disable one or more sensors (e.g., 6, 12, 14) that determine if the undesirable behavior is being exhibited by the pet 260; (c) to enable and disable the stimulator (e.g., 13) that delivers the correctional stimulus to the pet 260 for exhibiting the undesirable behavior; and/or (d) to adjust the level of deterrent stimulus applied to the pet 260 for exhibiting the undesirable behavior. The wireless signal is recognized by a receiver 7 of the collar command unit 4.

For simplicity, reference is made herein to the inhibition of a single type of undesirable behavior at a time. However, it should be understood that the subject collar 1 and collar command unit 4 may be used to inhibit two types of undesirable behavior, using the same or different stimulators 13 and sensors 6, 12, 14. For example, the bark detecting sensor 6 and/or the vibration sensors 14 may be used to sense unwanted vocalization by the pet 260, which is corrected by the stimulator 13. Additionally, the tracking chip 12 may be used to determine if the pet 260 has strayed outside a geographic boundary, in which case the same or a different stimulator 13 may be used to encourage the pet 260 to return to the designated area. It also should be understood that each behavior-deterring feature may be enabled or disabled individually or together, as dictated by the needs of the pet owner. In case of emergencies causing evacuation of a building (e.g., a fire), it may be useful to have the bark control feature overridden, while maintaining the perimeter control feature, so that a pet 260 who has evacuated the building does not leave the designated area outside the building.

Sensors:

Both the alarm unit 100 and the collar command unit 4 include one or more sensors, which are discussed below.

The housing 101 of the alarm unit 100 includes one or more sensors for detecting characteristics of the environment and for providing a corresponding output. The sensor 103 is coupled to the controller 130 where the controller 130 is capable of reading the output of the sensor 103 and responding in the appropriate programmed manner. However, the sensor 103 may be configured in any suitable manner to detect and provide a corresponding output.

In one preferred embodiment, there are multiple sensors 103 in the housing 101 coupled to the controller 130. In most examples, there will be more than one sensor 103 within the housing 101. In some cases, one sensor 103 may detect multiple environmental conditions. In an exemplary embodiment, one sensor 103 may function as a temperature sensor, and another sensor 103 may function as a smoke sensor (such as an ionization or photoelectric sensor).

In an embodiment having a smoke sensor, one exemplary smoke sensor 103 is an Ionization Chamber (IC) smoke detector with interconnect and terminal horn driver that complies with UL217 and UL268 specifications. Specifically, one suitable IC smoke sensor is identified as MOTOROLA® Model No. MC145018. With this sensor 103, the I/O pin (pin 2 of the MC145018) may be connected to the controller 130 (pin 45 of the ARDUINO® MEGA2560) using a solid core (green) jumper wire and a 22K metal oxide powder resistor that is RoHS-compliant. In this configuration, when the sensor 103 is used in conjunction with an ionization chamber (not shown), the sensor 103 detects smoke and emits an electrical signal through the I/O pin, thus informing the controller 130 that smoke has been detected.

In a potentially preferred embodiment, the housing 101 contains two independent temperature sensors 103. One exemplary temperature sensor 103 is identified as ARDUINO® Model No. TMP36. A solid core (orange) jumper wire connects the far left pin of the TMP36 sensor (flat side facing forward) to the power supply 102. A solid core (green) jumper wire connects the middle pin of the TMP36 sensor to pin 36 of the controller 130. The far right pin of the TMP36 sensor is connected to pin 56 of the controller, which is an isolated ground. The isolated ground connection prevents interference from disrupting the precise readings of the temperature sensor.

A second exemplary temperature sensor is located on a real-time clock (RTC), such as an ARDUINO® "DS3231" time-keeping chip (discussed in more detail below). In an exemplary arrangement, several different solid core jumper wires are used to connect various parts of the DS3231 RTC to the controller 130, as shown in TABLE 1 below.

TABLE 1

Real-Time Clock-to-Controller Connections

| Wire Color | DS3231 Part | Controller Location |
| --- | --- | --- |
| Yellow | SQW (square wave output) | Pin 8 |
| Orange | SCL (serial clock) | Pin 20 |
| Orange 2 | SDA (serial data) | Pin 19 |
| Red | VCC (voltage) | Pin 25 |
| Black | GND (ground) | Common ground |

Similarly to the alarm unit 100, the collar command unit 4 may include a number of different sensors. Specifically, the collar command unit 4 may sensors, such as a bark detector 6, one or more hazard detectors (collectively referred to herein with the numeral 8), and a tracking chip 12 (such as a GPS tracking chip conforming to NMEA 3.01 protocol; a Wi-Fi tracking chip conforming to IEEE 802.11 protocol or its subsequent versions; or a BLUETOOTH® low-energy beacon conforming to IEEE 802.15.1 protocol, its equivalents, or subsequent versions), all of which are operably connected to the controller 11.

Additionally, sensors 14, such as vibration detectors or vital monitoring detectors, may be mounted in or on the inside face of the strap 2 and be operably connected through the strap 2 to the controller 11. The vibration detectors 14 detect vibrations caused by actions, such as barking or growling, from the animal's vocal cords. In another case, the bark detector 6 detects sounds, vibrations, or a combination thereof, eliminating the need for strap-mounted vibration detectors 14.

Sensors may detect one or more of the location of the collar command unit 4, angular position of the device, accelerometer data, gravity sensor data, gyroscope data, lateral acceleration, rotation vector, step counter, step detector, charging status, or bark recognition, any of which (alone or in combination) is suggestive of the collar command unit 4 being worn by the pet 260 at the time of the event signal.

In a further instance, the tracking chip 12 detects the location of the pet 260 relative to the boundaries of a pre-determined perimeter and/or the global position of the pet 260. The tracking chip 12 may be used in collar command units 4 that do not include a bark detector 6 or vibration detectors 14, but which may or may not include a behavior-deterring stimulator 13 (discussed below). That is, the collar command unit 4 may serve only to assist the pet owner in locating the pet 260 in an emergency situation by providing location information in transmissions to a mobile device. With this location capability, the collar command unit 4 is useful for pets not known for vocalizing (such as cats) or for pets whose behavior ordinarily does not require stimulation to correct.

Some tracking chips use the proximity of the pet 260 to a predefined boundary, such as a buried wire, to trigger the stimulator 13. When the pet 260 approaches or crosses the boundary, the tracking chip 12 detects the location of the pet 260 and, assuming the behavior-deterring feature is active (i.e., enabled and not overridden), the stimulator 13 is allowed to deliver a deterrent stimulus to the pet 260 to encourage the pet 260 to return to the designated area.

Other tracking chips (e.g., Wi-Fi or BLUETOOTH®-based chips) create a virtual boundary defined by the strength of the signal between a base unit and the pet's collar command unit 4. With these tracking chips, a constant signal is provided to the collar command unit 4 by a separate base station, when the behavior-deterring feature is enabled. If the pet 260 strays beyond the designated boundary and outside the range of the wireless (e.g., BLUETOOTH®-based) transmission, the absence of the signal prompts the stimulator 13 to deliver a stimulus to the pet 260 to encourage the pet 260 to return to the designated area.

Interestingly, this same technology can be employed for bark control override as well. In a scenario contemplated herein, the absence of the transmission signal overrides the bark-control behavior-deterring feature. Such a configuration may be useful for overriding bark control when a pet 260 is taken for a walk outside the predefined geographic area. Additionally, in the event of an emergency, it may be useful for the bark-control feature to be overridden if the frightened pet 260 leaves the designated area and the pet's barking aids the pet owner in locating the pet 260.

The tracking chip 12 may include Global Positioning Satellite (GPS) technology that determines the pet's global location. The GPS-based tracking chip may be used alone or in conjunction with one of the other types of tracking chips described above. In one embodiment, the perimeter control feature may rely on a BLUETOOTH® tracking chip, while the GPS tracking chip may be used to determine the location of the pet after the pet has strayed from the predefined geographic area. With this configuration, the GPS tracking chip becomes enabled when the pet is beyond the range of the BLUETOOTH® signal. When a GPS-based tracking chip is used for perimeter control, the pet owner or his designee defines a boundary within which the pet is to remain. When the perimeter control behavior feature is enabled and the pet 260 crosses the boundary, the stimulator 13 delivers a deterrent stimulus to the pet 260 to encourage the pet 260 to return to the designated area.

One or more various other sensors may be present or substituted in the collar command unit 4, including, but not limited to: a sensor that monitors the animal's vital signs; a sensor that functions as a transceiver to receive and send wireless data; a sensor that functions as a receiver to receive wireless data; a sensor that functions as a slave device that receives instructions from a separate master device; a sensor that functions as a BLUETOOTH® device; and a sensor that is a combination of one or more vibration detectors 14, a device used for location 12, and/or a BLUETOOTH® device.

Counting Mechanism/Timer:

In both the alarm unit 100 and the collar command unit 4, the controller 130, 11 includes, or is connected to, a timer or counting mechanism 108, 17 to determine a time variable specific to a particular action or response.

The counting mechanism 108, 17 may comprise any method of keeping or telling time, including, but not limited to, a real-time clock (RTC), a hardware clock, a clock generator, a timer chip, a timing integrated circuit, a timer, or a third-party counter identifier, such as may be accessible via an internet connection. In one version contemplated herein, the counting mechanism 108, 17 is a hardware clock. In another version, the counting mechanism 108, 17 may also use a RTC to track the date and time. While reference may be made herein to the counting mechanism 108, 17 counting down a prescribed period, it should be recognized that the counting mechanism 108, 17 may instead measure time to a prescribed point in time (such as a particular hour), based on settings of a real-time clock or other mechanism.

In various embodiments of the alarm unit 100 and the collar command unit 4, the hardware clock utilizes a millis( ) function, which is part of the core library of the ARDUINO® open-source computer hardware and software company. The millis( ) function is used to determine the number of milliseconds that have lapsed since a given task was started/reset. The return value will overflow to 0 after approximately 49.7 days (2^32 milliseconds). The millis( ) counting is derived from the controller frequency (16 MHz on most ARDUINO® boards) and, therefore, is only as accurate as the crystal oscillator or ceramic resonator used on the board. The millis( ) timing is based on Timer0 of the board.

In addition to the hardware clock described above, the counting mechanism 108, 17 may further include a real-time clock (RTC) to keep the date and time. One exemplary RTC suitable for such purpose is a "DS3231" time-keeping chip (mentioned above), which is commercially available from ARDUINO®. The DS3231 is a low-cost, extremely accurate I2C real-time clock with an integrated temperature-compensated crystal oscillator (TCXO) and crystal resonator, which incorporates a battery input and which maintains accurate timekeeping when main power to the device is interrupted. The integration of the crystal resonator enhances the long-term accuracy of the device.

The RTC maintains seconds, minutes, hours, day, date, month, and year information. The date at the end of the month is automatically adjusted for months with fewer than 31 days, including corrections for leap year. The clock operates in either the 24-hour or 12-hour format with an AM/PM indicator. Two programmable time-of-day alarms and a programmable square-wave output are provided. Address and data are transferred serially through an I2C bidirectional bus. A precision temperature-compensated voltage reference and comparator circuit monitors the status of the positive supply voltage (VCC) to detect power failures, to provide a reset output, and to automatically switch to the backup supply when necessary. Additionally, the reset (RST) pin is monitored as a push-button input for generating a microprocessor (μP) reset.

The various roles of the timer 108 in building occupant protection system 200 are discussed with reference to the appropriate Figures. For example, the timer 108 tracks time for certain functions, cancels time remaining (when prompted), and communicates time remaining to the controller 130 for communication to the building occupant. The timer 108 may be reset by the building occupant in certain cases (e.g., to delay a routine system test).

The various roles of the timer, or counting mechanism, 17 in the collar command unit 4 are discussed in accompanying U.S. patent application Ser. No. 14/815,960, referenced above, and incorporated by reference herein in its entirety.

Light(s):

Both the alarm unit 100 and the collar command unit 4 may include a light 106, 15, which is used to signal the building occupant of an emergency or to provide information on the status of the emergency or the device 100, 4. The light 106, 15 may be electrically connected to any or all of the components within the housing 100, 18, and, particularly, may be connected to both the power supply 102, 9 and the controller 130, 11.

The lights 106, 15 may be LEDs that are visible to the human occupants of the building. The lights 106, 15 are especially important indicators for persons who are deaf or hearing-impaired. The lights 106, 15 may also flicker, flash, or strobe, if desired. In one or both of the alarm unit 100 and the collar command unit 4, the lights 106, 15 may be capable of displaying multiple colors, each of which may be indicative of an associated condition. For example, the light 106, 15 may display a green color when the device is functioning properly, while the light 106, 15 may display an orange color when the device needs testing or recharging.

Alternately, the alarm unit 100 and/or the collar command unit 4 may include more than one light 106, 15, and the multiple lights 106, 15 may be different colors. An alternate variation may involve lights 106 (or 15) that pulse at different frequencies to indicate the alert and warning states. For example, a bright light 106, such as a powerful LED, may pulse when the audio alert device 105 is activated to indicate that an emergency condition exists. Again, such changes in the light 106 being displayed may be particularly helpful for building occupants who are deaf or hearing-impaired.

In another embodiment, a number of lights 106, 15 of different colors may be employed, where each color is indicative of either the status of the building occupant protection system 200 or the severity of the threat being detected by a sensor 103 or a hazard detector 8. In a normal operational state, a first light 106 is active, and the first light 106 is a green LED. In an alert state, when a threat has been sensed, the first light 106 is inactive, and a second light 106 of a different color (e.g., a red LED) is active. When the alarm has been manually dismissed by the building occupant, a third light 106 of a different color (e.g., a blue LED) is active. During a test mode (as described in FIGS. 8A and 8B), the first (green) light 106, the second (red) light 106, and the third (blue) light 106 are inactive, and a fourth light 106 of a different color (e.g., a yellow LED) is active.

In an exemplary arrangement of the alarm unit 100 having separate LEDs, as described above, the LEDs are connected to the controller 130 as follows. Each LED has an anode (long leg) and a cathode (short leg). The cathode of each LED is connected, via a RoHS-compliant resistor, to the controller 130. In an exemplary arrangement, several different solid core jumper wires are used to connect the anodes to the controller 130, as shown in TABLE 2 below.

TABLE 2

LED Light Anode-to-Controller Connections

| LED Color | Wire Color | Resistor Type | Controller Location |
| --- | --- | --- | --- |
| Green | Orange | 220-ohm | Pin 30 |
| Red | Yellow | 220-ohm | Pin 34 |
| Yellow | Orange 2 | 220-ohm | Pin 31 |
| Blue | Green | 560-ohm | Pin 33 |
| Super-Bright White | White | 560-ohm | Pin 35 |

A first pole and throw of a double-pole, double-throw (DPDT) relay connect the controller 130 to an audio alert device 105 (discussed below). A second pole and throw of the DPDT relay connect the controller 130 to the blue-LED light 106. Ordinarily, the first pole and relay are closed to deliver an electric current from the controller 130 to the audio alert device 105, which activates the audio alert device 105 when a threat is detected. When the alarm is manually dismissed or when the communication device 107 is broadcasting a message, the power supply 102 delivers an electric current, via a solid core (orange) jumper wire, through pin 44 of the controller 130 to energize the DPDT relay. The electric current opens the first pole on the relay, thus breaking the connection between the controller 130 and the audio alert device 105 (that is, turning off the siren). Simultaneously, the second throw closes and forms a circuit between the blue LED light 106 and the 5-volt power supply 102 attached to the controller 130. As a result, the blue LED light 106 is activated, indicating that the alarm unit 100 is unable to broadcast an audible sound from the audio alert device 105, even if a threat is sensed.

In embodiments that include a super-bright white LED light 106 instead of, or in addition to, the blue LED light 106, the anode of the super-bright white light 106 is connected to a second DPDT relay. The DPDT relay is normally in an open position. When the alarm is manually dismissed or when the communication device 107 is broadcasting a message, the power supply 102 delivers an electric current, via a solid core (white) jumper wire, through pin 35 of the controller 130 to energize the DPDT relay. When energized, the cathode of the super-bright white LED light 106 is connected to the common ground of the controller 130 by a 560-ohm, RoHS-compliant metal oxide power resistor.

The electric current closes the first pole on the relay, thus breaking the connection between the controller 130 and the audio alert device 105 (that is, turning off the siren). Simultaneously, the second throw closes to form a circuit between the super-bright white LED light 106 and the 5-volt power supply 102 attached to the controller 130. As a result, the super-bright white LED light 106 is activated, indicating that the alarm unit 100 is unable to broadcast an audible sound from the audio alert device 105, even if a threat is sensed.

Audio Alert Device:

In the alarm unit 100 of the building occupant protection system 200, an audio alert device 105 is located within the housing 101. The audio alert device 105 is any device capable of transmitting a loud audible tone, such as a siren, a speaker, or a piezoelectric device. The audio alert device 105 is electrically connected to the controller 130 and the sensor 103 within the housing 101, as well as any or all other components within the housing 101. However, the audio alert device 105 may be configured in any suitable manner to produce an audible alert upon the detection of a threat by the sensor(s) 103. The audible alert or cue may be a tone, pattern of tones, sequence of tones, or the like, which are recognizable by the building occupant 210 and which may be pre-programmed or programmed by the building occupant 210.

In an exemplary embodiment, the audio alert device 105 is a piezoelectric horn driver, which is connected to the MOTOROLA® Model No. MC145018 smoke sensor 103. When smoke is detected by the sensor 103, the external piezoelectric transducer and internal drivers of the audio alert device 105 produce an easily recognizable alarm sound of high volume (e.g., about 75 to 90 decibels). Similarly, the audio alert device 105 may respond to the detection of a threat from any other type of sensor 103.

Communication Device:

In the alarm unit 100 of the building occupant protection system 200, a communication device 107 is located within the housing 101, preferably near an opening in the housing (not shown) to facilitate audible transmissions therefrom. Coupled to the controller 130, the communication device 107 is any device capable of receiving and transmitting audio, such as a transceiver portion and an associated speaker (not separately shown). The transceiver portion of the communication device 107 is coupled to the speaker by conventional means. The transceiver portion and the speaker may be configured in any suitable manner such that the transceiver portion may receive a signal and send the signal to the speaker, and the speaker may receive the signal and transmit an audible output to the environment around the alarm unit 100.

In one embodiment, the transceiver portion of the communication device 107 may include a receiver and a transmitter, which are capable of converting an input into an appropriate output to be sent to the speaker portion of the communication device 107, thereby resulting in an audio output. In another embodiment, the communication device 107 may include multiple separate pieces, which work cooperatively with one another to perform the functions of the communication device 107.

The audio output may be a vocal communication (also referred to as a vocal annunciation) or voice output. Alternately, the audio output may be an audio file, including a message file or music file.

When at least one sensor 103 detects a threat above a certain threshold level, the controller 130 may activate the communication device 107 to transmit a message to the building occupants 210, 260. In other instances, the building occupant 210 may use his mobile device 220 (e.g., cellular telephone) to activate the communication device 107 to broadcast his voice (or chosen audio file) through one or more of the alarm units 100.

Receiver:

The collar command unit 4, as shown in FIG. 1B, may include a receiver 7 or other electronic device, as described below, which receives an event signal. The receiver 7 may also be part of a transceiver, or any other multi-functional device that is able to receive a wireless signal from a nearby device. Within the collar command unit 4, the receiver 7 is coupled (a) directly to the controller 11, which is coupled to other devices within the collar command unit 4; or (b) to any or all the components within collar command unit 4, either directly or indirectly by any means known in the art. In some instances, the receiver 7 receives a wireless signal from a building occupant protection system. Alternately, the receiver 7 may receive a wireless signal from a separate device, such as a mobile device (e.g., cellular telephone operated by the pet owner) or a remote station (e.g., a signal from a third-party monitoring service).

More specifically, the receiver 7 may comprise any device for receiving wireless data, such as a wireless communication module where the signal is compatible with the communication protocol standards for (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions.

In one version contemplated herein, the receiver 7 comprises a BLUETOOTH® transceiver, such as a BLUETOOTH® low-energy beacon, examples of which are an HC-05 wireless radio frequency transceiver and an HM-10 iBeacon® chip. With these low-energy beacons, the receiver 7 uses little operating power and operates in frequencies between 2400 and 2483.4 MHz (including a guard band of 2 MHz at the lower end of the frequency range and 3.5 MHz at the upper end of the frequency range). In one version, the receiver 7 uses a radio (broadcast) communications system, so that a visual line of sight between the receiver 7 and the transmitting device is not required, provided a quasi-optical wireless path is available.

In a first mode of operation, when an emergency is detected, an event signal is transmitted to the receiver 7 from a building occupant protection system. In another mode of operation, the collar command unit 4 contains one or more hazard detectors 8 that detect hazards, such as smoke, heat, carbon monoxide, or loud sounds, such as sirens from fire or burglar alarms, fireworks, or gunfire. When the hazard detector 8 detects one or more of these hazards, the hazard detector 8 transmits an event signal to the receiver 7. In an alternate mode of operation, the receiver 7 itself is equipped as a hazard detector that detects hazards, such as smoke, heat, carbon monoxide, or loud sounds, and that interprets the detection of the hazard as an event signal.

Transmitter:

The collar command unit 4, as shown in FIG. 1B, may be equipped with a transmitter 16 that transmits a wireless signal to a separate device when activated. The wireless transmitter 16 may also be part of a transceiver, or any other multi-functional device that is able to transmit a wireless signal. In one exemplary case, the wireless transmitter 16 is coupled to the controller 11, which is coupled to other devices within the command unit 4. In another instance, the wireless transmitter 16 within the collar command unit 4 may be electrically connected to any or all the components within collar command unit 4 either directly or indirectly by any means known in the art.

More specifically, the wireless transmitter 16 may comprise any device for sending wireless data, such as a wireless communication module where the signal is compatible with the communication protocol standards for (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions. Alternately or additionally, the transmitter 16 may include a Wi-Fi or cellular-capable chip. In one version contemplated herein, the transmitter 16 transmits data wirelessly to a building occupant protection system. In other versions, the transmitter 16 transmits data wirelessly to a mobile device 220 (such as a cellular telephone associated with the pet owner) or a remote station 230, 240 (such as a device associated with a third-party monitoring company).

In one embodiment, the wireless transceiver 120 is a tracker with Wi-Fi capabilities, which is able to detect signals from any mobile devices 220, 4 capable of connecting wirelessly to Wi-Fi. The signals from the mobile devices 220, 4 may include a Service Set Identification (SSID) or MAC address or other identifying information, which may be used by the controller 130 to affiliate a signal with one of the building occupants 210, 260.

In one exemplary configuration, the wireless transmitter 16 comprises a BLUETOOTH® transceiver, such as a BLUETOOTH® low-energy beacon, examples of which are an HC-05 wireless radio frequency transceiver and an HM-10 iBeacon® chip. With these low-energy beacons, the transmitter 16 uses little operating power and operates in frequencies between 2400 and 2483.4 MHz (including a guard band of 2 MHz at the lower end of the frequency range and 3.5 MHz at the upper end of the frequency range). In one version, the transmitter 16 uses a radio (broadcast) communications system, so that a visual line of sight between the transmitter 16 and the receiving device is not required, provided a quasi-optical wireless path is available.

In some versions of the present collar command unit 4, the pet owner may program the controller 11 with contact information for the person(s) to be notified in the event that a triggering threat is detected. Such contact information may include the phone number, e-mail address, or other contact information for one or more persons to be notified. When a triggering event is detected, the wireless transmitter 16 may alert the contact(s) programmed into the memory of the controller 11, for example, by calling, sending an e-mail, and/or sending an SMS or MMS text message to a device (such as a cellular telephone) having an application for receiving such messages.

In at least one example, the transmitter 16 may use a Subscriber Identity Module (SIM) card or a Global System for Communication (GSM) connection to connect to the internet, using general packet radio service (GPRS) on the 2G and 3G cellular communications company's global system. Advantageously, because the transmitter 16 is capable of sending short message service (SMS) text messages, the collar command unit 4 functions similarly to a cellular telephone, which may be useful in the event that the building lacks electricity or internet connection.

In some instances, the transmitter 16 may wirelessly connect to a mobile device or remote station and may rely on telephone circuit or internet connection of the mobile device or remote station for transmitting a message. For example, the transmitter 16 on the collar command unit 4 may transmit a message to a remote device (e.g., an alarm) in a building, and the remote device may use the building's home telephone line or internet connection, using a Wi-Fi circuit, to communicate with the pet owner, third-party monitoring company, or emergency service personnel.

It should be understood that, although the receiver 7 and the transmitter 16 are described as separate components of the collar command unit 4, a single component (such as a transceiver) may be capable of functioning as both the receiver 7 and the transmitter 16. Thus, the present disclosure is intended to encompass both collar command units 4 having separate receivers 7 and transmitters 16 and collar command units 4 having integrated transceivers for performing the desired receiving and transmitting functions.

Transceiver:

The alarm unit 100 further includes a wireless transceiver 110, which is located within the housing 101 and which is electrically connected to any or all of the components within the housing 101. The transceiver 110 is connected to the controller 130 by any operable means known in the art. The wireless transceiver 110 is any electronic device capable of receiving and transmitting wireless data, particularly over a short distance range. The wireless transceiver 110 may include individual components, such as a receiver and a transmitter, as discussed above.

The wireless transceiver 110 may comprise any device for sending wireless data, such as a wireless communication module where the signal is compatible with the communication protocol standards for (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions.

In one exemplary configuration, the wireless transceiver 110 is a BLUETOOTH® transceiver, such as a BLUETOOTH® low-energy beacon, examples of which are an HC-05 wireless radio frequency transceiver and an HM-10 iBeacon® chip. With these low-energy beacons, the transceiver 110 uses little operating power and operates in frequencies between 2400 and 2483.4 MHz (including a guard band of 2 MHz at the lower end of the frequency range and 3.5 MHz at the upper end of the frequency range). In one version, the transceiver 110 uses a radio (broadcast) communications system, so that a visual line of sight between the transceiver 110 and the receiving device is not required, provided a quasi-optical wireless path is available.

In some versions of the present alarm unit 100, the building occupant may program the controller 130 with contact information for the person(s) to be notified in the event that a triggering threat is detected. Such contact information may include the phone number, e-mail address, or other contact information for one or more persons to be notified. When a triggering event is detected, the wireless transceiver 110 may alert the contact(s) programmed into the memory of the controller 130, for example, by calling, sending an e-mail, and/or sending an SMS or MMS text message to a device (such as a cellular telephone, smart watch, or tablet) having an application for receiving such messages and within range for receiving such messages.

In at least one example, the transceiver 110 may use a Subscriber Identity Module (SIM) card or a Global System for Communication (GSM) connection to connect to the internet, using general packet radio service (GPRS) on the 2G and 3G cellular communications company's global system. Advantageously, because the transceiver 110 is capable of sending short message service (SMS) text messages, the alarm unit 100 functions similarly to a cellular telephone, which may be useful in the event that the building lacks electricity or internet connection.

The transceiver 110 may also include a Wi-Fi or cellular-capable chip. The Wi-Fi chip may have tracking capabilities, which sense the "ping" from compatible devices (such as cellular telephones) within the range of the Wi-Fi network. Thus, the Wi-Fi chip is able to detect Wi-Fi compatible devices capable of automatically connecting to the Wi-Fi network in the building. In one embodiment, in the event of an emergency, the transceiver 110 is able to communicate the threat to all devices within the network range, regardless of whether each recipient is a regular building occupant or a guest.

Communication Circuit:

The housing 101 of the alarm unit 100 may, optionally, include a communication circuit 120, which is electrically connected to any or all of the components in the housing 101. The communication circuit 120 may include any means for allowing the alarm unit 100 to transmit data to a remote station located beyond the range of the alarm unit 100 (e.g., a third-party monitoring company or local emergency service providers). The building occupant, or his designee, may program the controller 130 with the contact information (e.g., e-mail address, telephone number) of the remote service providers. The communication circuit 120 may also be capable of receiving communications as well.

In one embodiment, the communication circuit 120 may employ Wi-Fi or BLUETOOTH® technology within the building to send an SMS or MMS text message to an occupant-defined e-mail address or telephone number, assuming the remote device or station has an ability to receive such messages. In another embodiment, the communication circuit 120 may employ Wi-Fi or BLUETOOTH® technology to make a connection with a mobile device or remote station and to use the communication circuit (e.g., telephone or internet connection) of the mobile device or remote station to transmit the communication. In yet another embodiment, the communication circuit 120 includes a standard telephone line.

Alternately, the communication circuit 120 may leverage a Subscriber Identification Module (SIM) card (located within the housing 101) or a Global System for Mobile Communication (GSM) connection. With these technologies, the controller 130 is able to connect to the internet using general packet radio service (GPRS) on the 2G and 3G cellular communications company's global system. Advantageously, because the communication circuit 120 is capable of sending short message service (SMS) text messages, the alarm unit 100 functions similarly to a cellular telephone, which may be useful in the event that the building lacks electricity or internet connection.

Figure 2:
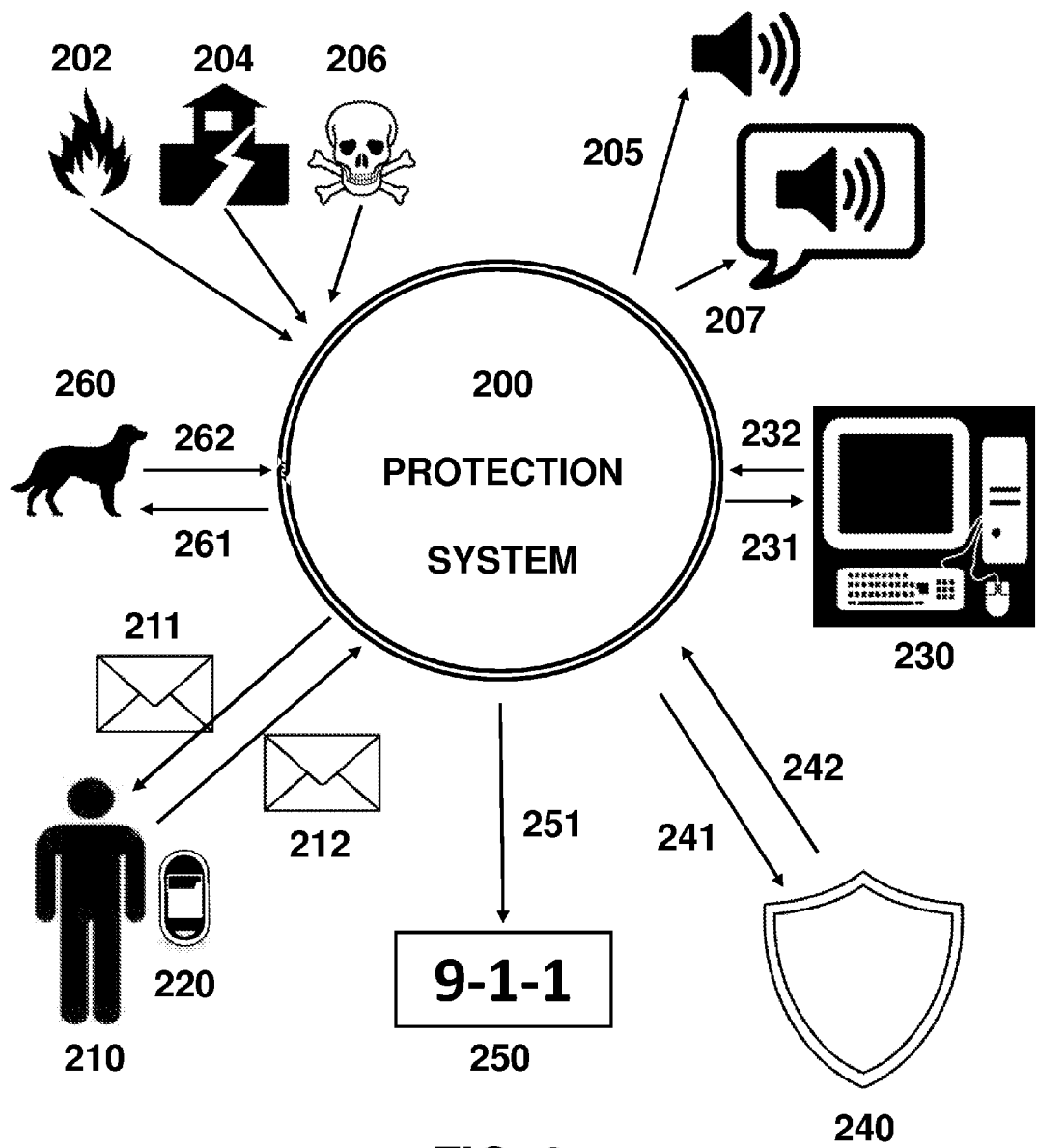
FIG. 2 is a schematic diagram of communication among a building occupant protection system including the alarm unit of FIG. 1A, the collar command unit of FIG. 1B, a human occupant, and, optionally, local emergency services and/or a third-party monitoring company, according to an aspect of the present disclosure.

An overview of the operation of the building occupant protection system 200 is provided schematically in FIG. 2. The building occupant protection system 200 includes a number of individual alarm units 100, which are installed in various rooms in the building to be protected and which are interconnected to one another. Each alarm unit 100 may be identical in configuration and function, with the exception of the setting of a DIP switch within the alarm unit 100. Each alarm unit 100 may have a DIP switch orientation that is different from other alarm units 100 in the building, such that an individual alarm unit 100 may become associated with a particular room during installation and the alarm units 100 may be able to recognize each other.

In the event of a triggering threat or emergency (e.g., a fire 202, an earthquake 204, or a dangerously high level of noxious gas 206), the sensors 103 in one or more of the alarm units 100 are activated. In such a configuration having multiple alarm units, a first alarm unit 100 may sense a threat (e.g., smoke). The first alarm unit 100 communicates wirelessly (e.g., through RF waves) or through a wired connection (if hard-wired) to the other alarm units 100 that a threat has been sensed. The communication from the first alarm unit 100 to the other alarms can be in series or in parallel.

The alarm units 100 may be interconnected with one another by being hard-wired or by being wirelessly connected. Interconnected alarm units 100 provide an increased measure of safety, as the alarm units 100 function simultaneously when one alarm unit 100 senses a threat. Hardwiring of interconnected alarm units 100 is commonly achieved in new construction or major remodeling projects, because of the expense and complication of installing electrical connections between all of the alarm units. Wireless interconnected alarm units 100 may be individually wired into a building's electrical system, may be battery-operated, or both. In this case, each alarm unit 100 acts as a node in a mesh network, relaying signals to provide complete coverage of the building. A combination of hard-wired interconnected alarm units and wireless interconnected alarm units may also be employed.

The sensors 103 provide information to the controller 130, which activates the audio alert signal 105 (e.g., a siren) as an indicator that a triggering threat or event has been detected. The controller 130 begins an "event notification mode" protocol. The transceiver 110 of each of the alarm units 100 transmits an event alert communication 211 to a mobile device (e.g., a cellular telephone 220 or collar command unit 4) of any building occupant 210, 260 that may be located in the room in which the alarm unit 100 is installed. Thus, each alarm unit 100 in the building transmits an event signal that functions as a survey or roll-call of building occupants 210, 260. The specific details of this event notification and its delivery are described in more detail with reference to FIGS. 5A and 5B.

In turn, the receiver of the mobile device 220 receives the message 211. The building occupant 210 may choose to override the alarm, to broadcast a voice communication to other building occupants, or to summon help from emergency services personnel. The building occupant 210 may proactively respond to the building occupant protection system 200 (e.g., by overriding the alarm signal), or the cellular telephone 220 of the building occupant 210 may respond to the event alert communication with a response signal 212 (or "ping") that the building occupant protection system 200 employs in identifying the location of the building occupant 210 (as described with reference to FIG. 6A).

In one embodiment (discussed with reference to FIG. 3), the building occupant 210 may leverage the cellular telephone 220 and its connection to the building occupant protection system 200 to broadcast his voice as a verbal communication 207. Alternately, or in addition, the building occupant protection system 200 may use the communication device 107 of one or more of the alarm units 100 to broadcast a system-generated verbal communication 207, which provides information regarding the nature of the threat, the location of the threat, the location of the building occupants, and the like (as discussed herein with reference to FIGS. 4A and 4B).

The controller 130 of the building occupant protection system 200 may also prompt the transceiver 110 to send data 231 to a remote station 230, which may include computers, a cloud-based computer network, HVAC controllers, and any other device capable of connecting to the building occupant protection system 200. The remote stations 240 may send data 232 back to the protection system 200.

The data sent between mobile devices 211 or remote stations 231 and the occupant protection system 200 may include, for example, messages, notifications, statistics, background signals, diagnostics, audio files, environmental statistics, sensor outputs, warning signals, identification information and the like. In one embodiment the data 211, 212, 231, 232 may be transmitted back and forth as necessary without the need for interaction by a building occupant 210.

In one embodiment, a building occupant 210 may request specific data 211 or send data 212, as necessary. For example, a building occupant 210 may use his mobile device 220 to make a request for information 212 (e.g., the temperature in the room where the protection system 200 is located), and the system 200 may respond by sending data 211 to the building occupant 210 (in this case, the temperature in the room). In a preferred embodiment, this data transfer 211, 212 may be managed through an application on the mobile device 211. In another embodiment, the application may be housed on a computer (e.g., 230), a tablet, or a smart watch.

The alarm unit 100 of the building occupant protection system 200 also sends an event signal 261 to any pet 260 that is wearing a collar command unit 4 (as discussed above) and that is within range of the signal. The receiver 7 in the collar command unit 4 receives the event signal 261, and the transmitter 16 in the collar command unit 4 transmits a response signal 262 that the building occupant protection system 200 employs in identifying the location of the pet 260 (as described in reference to FIG. 6B).

Under certain circumstances, the building occupant protection system 200 may transmit an event message 241 to a third-party monitoring service 240 or may receive instructions 242 from a third-party monitoring service 240. In some instances, the building occupant protection system 200 may send an event message 251 to local emergency service providers 250 (identified in the United States by the telephone number 9-1-1).

While reference is made above and throughout the present disclosure to a cellular telephone as the mobile device 220 associated with the (human) building occupant 210, it should be understood that other mobile devices normally carried by or worn by the building occupant 210 may be used. For instance, the mobile device 220 may be a smart watch or a tablet, instead of a cellular telephone. In one embodiment, the mobile device 220 is a so-called "smart phone" with an advanced operating system.

Specific details of the operation of the building occupant protection system 200 and its various features are discussed in detail with reference to FIGS. 3 through 10.

Figure 3:
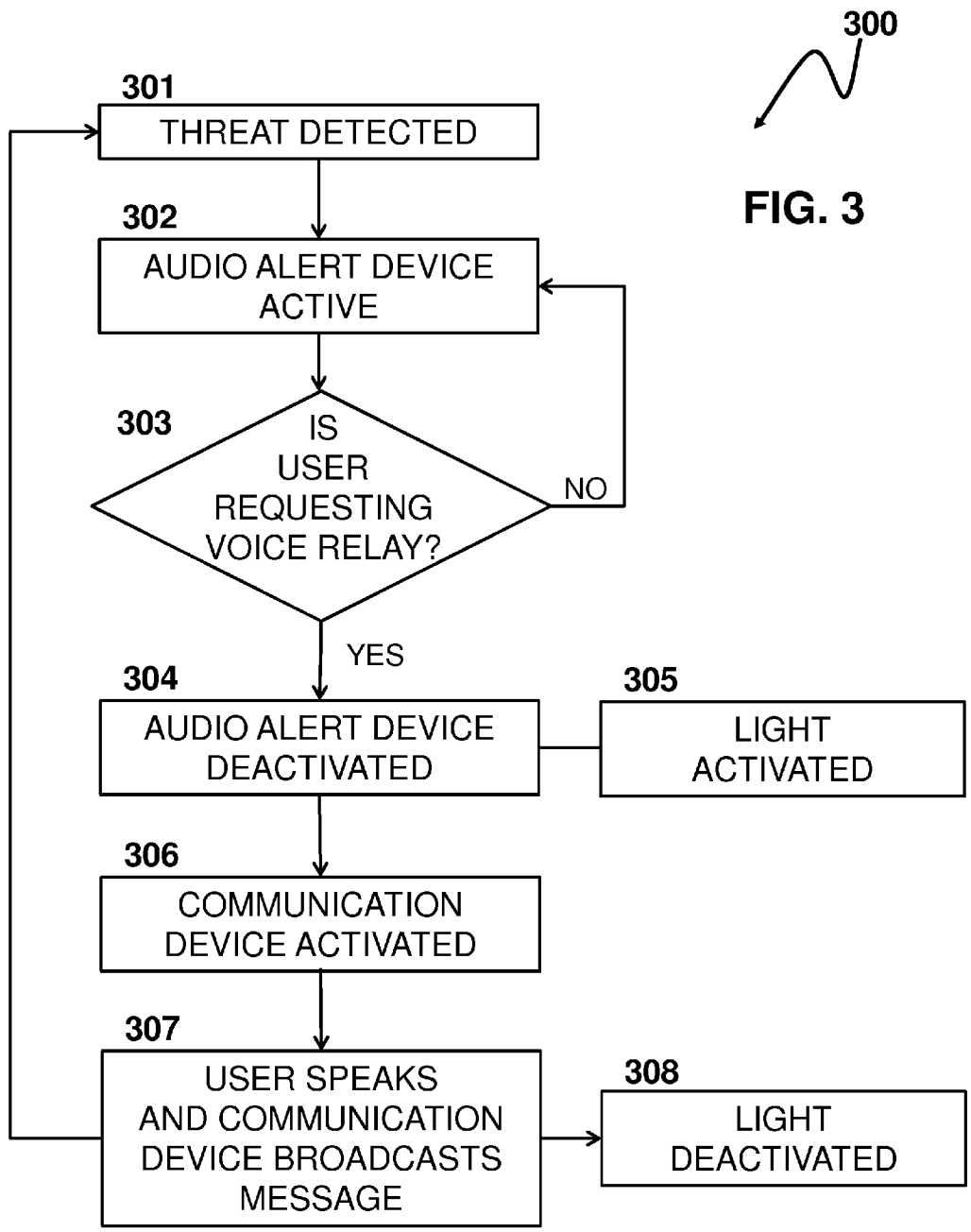
FIG. 3 is an exemplary flow diagram, which illustrates the steps taken by the human occupant to broadcast his voice through the alarm unit of FIG. 1A.

FIG. 3 is an exemplary flow diagram that illustrates a process 300 through which the human occupant 210 is able to broadcast his voice through the alarm unit 100 of FIG. 1A. When the sensors 103 in the alarm unit 100 detect a threat (step 301), the controller 130 activates the audio alert device 105, and the audio alert device 105 produces a loud and recognizable sound (step 302). The building occupant 210 receives an event alert notification, via his mobile device 220 according to a protocol described with reference to FIGS. 5A and 5B. The mobile device 220 enters "event notification mode," which may include an option for the building occupant 210 to request voice relay (step 303).

The voice relay feature temporarily deactivates the audio alert device 105 (step 304) and activates a communication device 107 (step 306), thereby permitting the building occupant 210 to speak into his mobile device 220 and have the communication device 107 broadcast, or relayed, the message through the alarm units 100. Such a mechanism is useful in instances when the building occupant 210 wants a personal message to alert other occupants or when the building occupant 210 himself needs assistance.

The communication device 107 may broadcast the message in real-time (as the building occupant 210 is speaking)

or a memory device in the alarm unit 100 may record the message, which is subsequently played by the communication device 107. To engage the relay feature, the building occupant 210 may depress and hold a button while speaking; or may depress a button, release the button, and speak for a short period (e.g., 30 seconds); or may depress a button to begin his message and depress the button for a second time to end his message.

As described above, the alarm unit 100 includes one or more lights 106 that are indicative of the status of the alarm unit 100. In an exemplary arrangement having multiple LEDs of different colors, when the threat is detected (step 301), the green LED light 106 is deactivated, and the red LED light 106 is activated. When the audio alert device is deactivated (step 304), the red LED light 106 is deactivated, and a blue or super-bright white LED light 106 is activated (step 305). The light that indicates the alarm unit 100 is in "communication mode" is important, because it signals the building occupants 210 that the audio alert device 105 is not active and will not produce sound as long as the alarm unit 100 is in communication mode. After the message from the building occupant 210 has been broadcast (step 307), the communication device 107 is deactivated and the blue or super-bright white LED light 106 is also deactivated (step 308), indicating that the alarm unit 100 has returned to event mode.

In another embodiment, the voice relay feature may be used, even if a threat has not been detected or a systems test performed. In this scenario, the building occupant 210 may use an application on his mobile device 220 to access the voice relay feature and to broadcast his voice or an audio file through the alarm units 100. It should be noted that the (blue LED) light 106 associated with voice broadcast is activated, whether the voice relay feature is being used while the system 200 is in event mode or its ready mode. The audio file may be pre-loaded onto the mobile device 220 or the alarm unit 100, or the audio file may be accessed from the internet via the communication circuit 120. It is contemplated that the building occupant 210 may leverage the communication capability of the system 200 to broadcast music through the communication devices 107 of one or more alarm units 100.

Figure 4A:
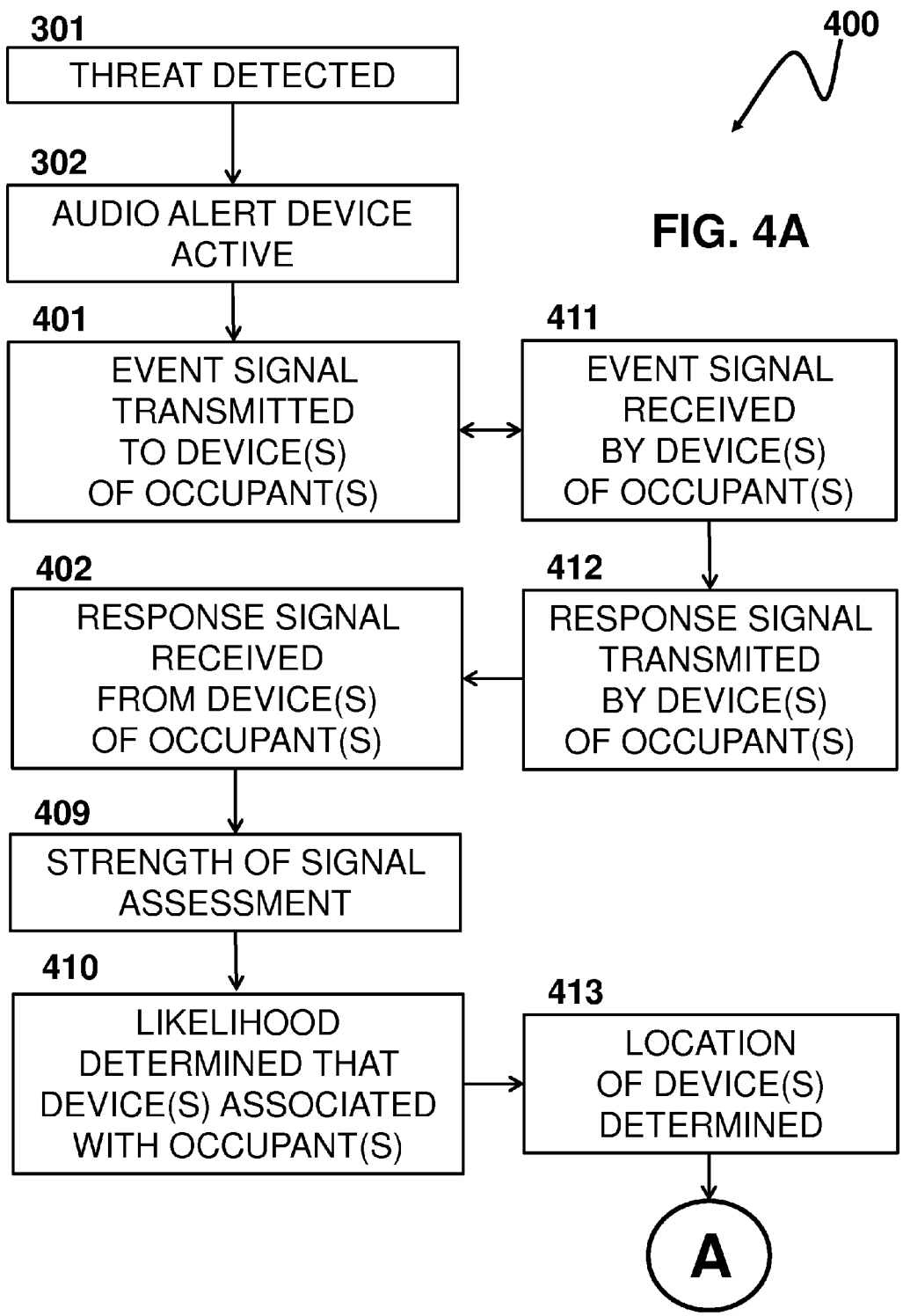
FIG. 4A is an exemplary flow diagram, which illustrates the steps taken to identify the location of occupants in a building protected by the present building occupant protection system.
Figure 4B:
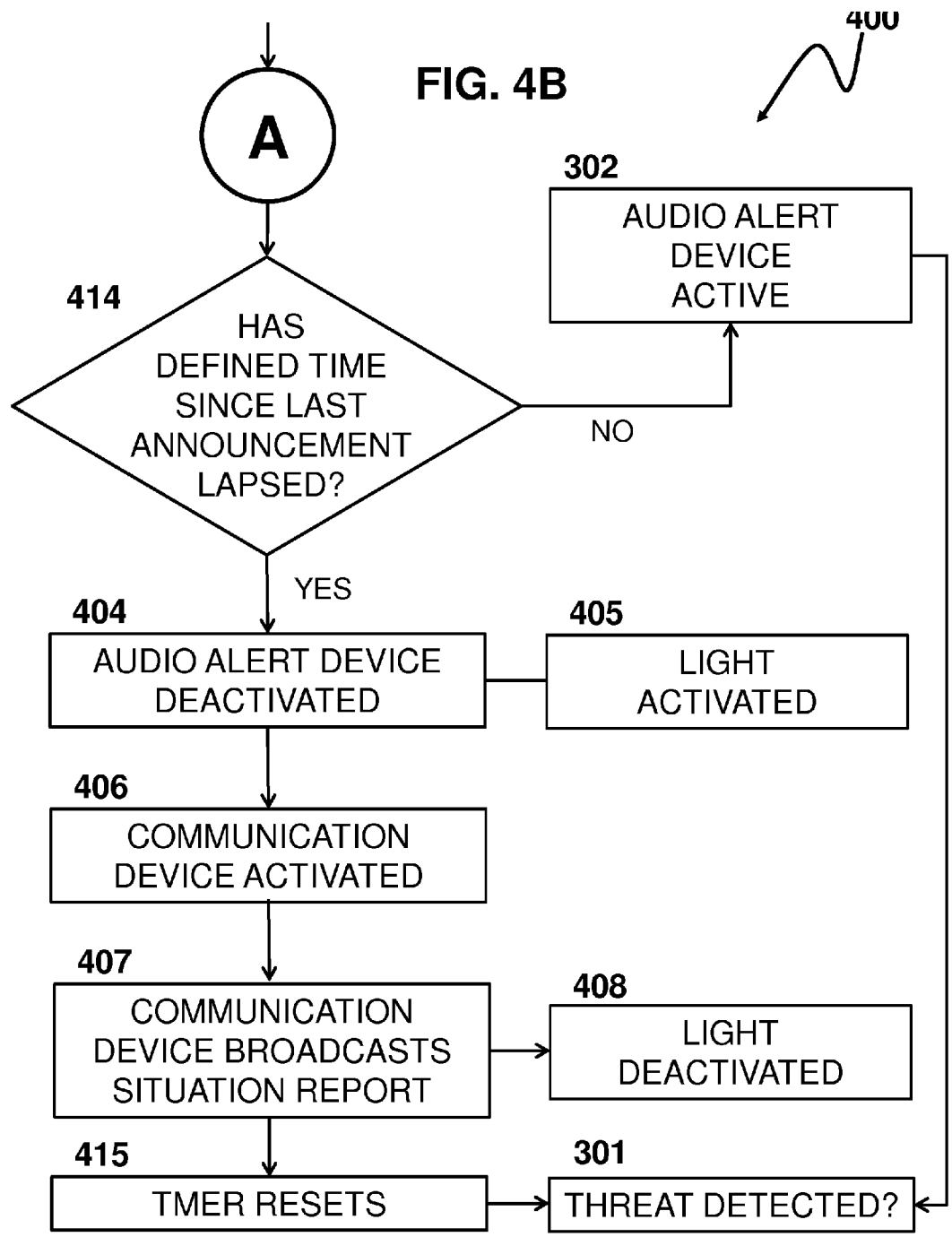
FIG. 4B is an exemplary flow diagram, which is a continuation of the steps of FIG. 4A and which illustrates further steps taken to broadcast the location of occupants in the building protected by the present building occupant protection system.

FIGS. 4A and 4B are exemplary flow diagrams that illustrate a process 400 through which the building occupant protection system 200 is able to identify the location of occupants in a building (FIG. 4A) and to broadcast the location of occupants in the building protected by the present building occupant protection system (FIG. 4B).

When the sensors 103 in the alarm unit 100 detect a threat (step 301), the controller 130 activates the audio alert device 105, and the audio alert device 105 produces a loud and recognizable sound (step 302). The controller 130 of the alarm unit 100 prompts the transceiver 110 to transmit an event signal to the mobile device 220 of the building occupant 210 and/or to the collar command unit 4 of the pet 260. The mobile device 220 and/or the collar command unit 4 receive the signal (step 411) and, in at least one embodiment, transmit a response signal to the alarm unit 100 (step 412). The transceiver 110 of the alarm unit 100 receives the response signal from the devices 220, 4. As long as the alarm unit 100 is in event mode (sensors 103 detecting a threat), the transceiver 120 transmits an event signal; and, in one embodiment, as long as the mobile device 220, 4 of the building occupant is in range of the signal, the transceivers or transmitters of the mobile device 220, 4 transmits a response signal.

The controller 130 of the alarm unit 100 receiving the response signal performs a comparison with the other alarm units 100 in the building occupant protection system 200 to assess the strength of the response signal (step 409). Initially, the signal strength should be above a certain threshold for comparison. By way of example and not limitation, an sufficient signal strength (RSSI) value is greater than about 60 dBm (decibel-milliwatts).

When sufficiently strong, the response signal received by a first alarm unit 100 may be compared with the response signal received by the other alarm units 100 using nearest sensor technology to determine the likelihood that the device 220, 4 is associated with a building occupant 210, 260 (step 410) and to pinpoint the location of the device 220, 4 (step 413) and, therefore, the building occupant 210, 260. The location of the building occupant 210, 260 may be determined by evaluating response signals received by multiple alarm units 100 using processes such as changes in time-distance arrival of signal, triangulation, trilateration, as well as received signal strength indicators (RSSI) mentioned above. Thus, the alarm unit 100 having received a response signal of the greatest strength is likely to be located in the same room as the device 220, 4 of the building occupant 210, 260 transmitting the response signal.

The specific steps taken to determine the likelihood of the device 220, 4 being associated with a building occupant 210, 260 are described in further detail with reference to FIGS. 6A and 6B.

In one embodiment, the communication device 107 may announce the location of the building occupant(s) 210, 260 through voice annunciation, with some frequency, such as every minute, every 2 minutes, every 3 minutes, or at some other interval. If the defined time since the last announcement has not lapsed (step 414), the audio alert device 105 remains active (step 302). However, if the defined time since the last announcement has lapsed (step 414), the audio alert device 105 is deactivated, and the (blue LED) light 106 associated with the communication mode is activated (step 405). The communication device 406 is activated (step 406), and the controller 130 directs the communication device 406 to broadcast a "situation report" (step 407). When the situation report is completed, the (blue LED) light 106 is deactivated, and the timer 108 resets.

The "situation report" broadcast by the communication device 107 (step 407) may include one or more of: the type of threat detected, the location of the threat, the number of building occupants detected, the species of occupants detected, the location of the occupants detected, the time remaining for the building occupant 210 to dismiss the alarm, and the like.

In another embodiment, when the remote device 220, 4 receives an event signal, the device 220, 4 activates a GPS feature within the device. Such activation permits the building occupant protection system 200 or a third-party monitoring service 240 to track the location of the building occupant 210, 260, thereby assessing whether the occupant 210, 260 remains inside the building or whether the occupant 210, 260 has safely evacuated. Alternately or additionally, the building occupant 210 may use the GPS tracking feature to determine the location of his pet 260.

Figure 5A:
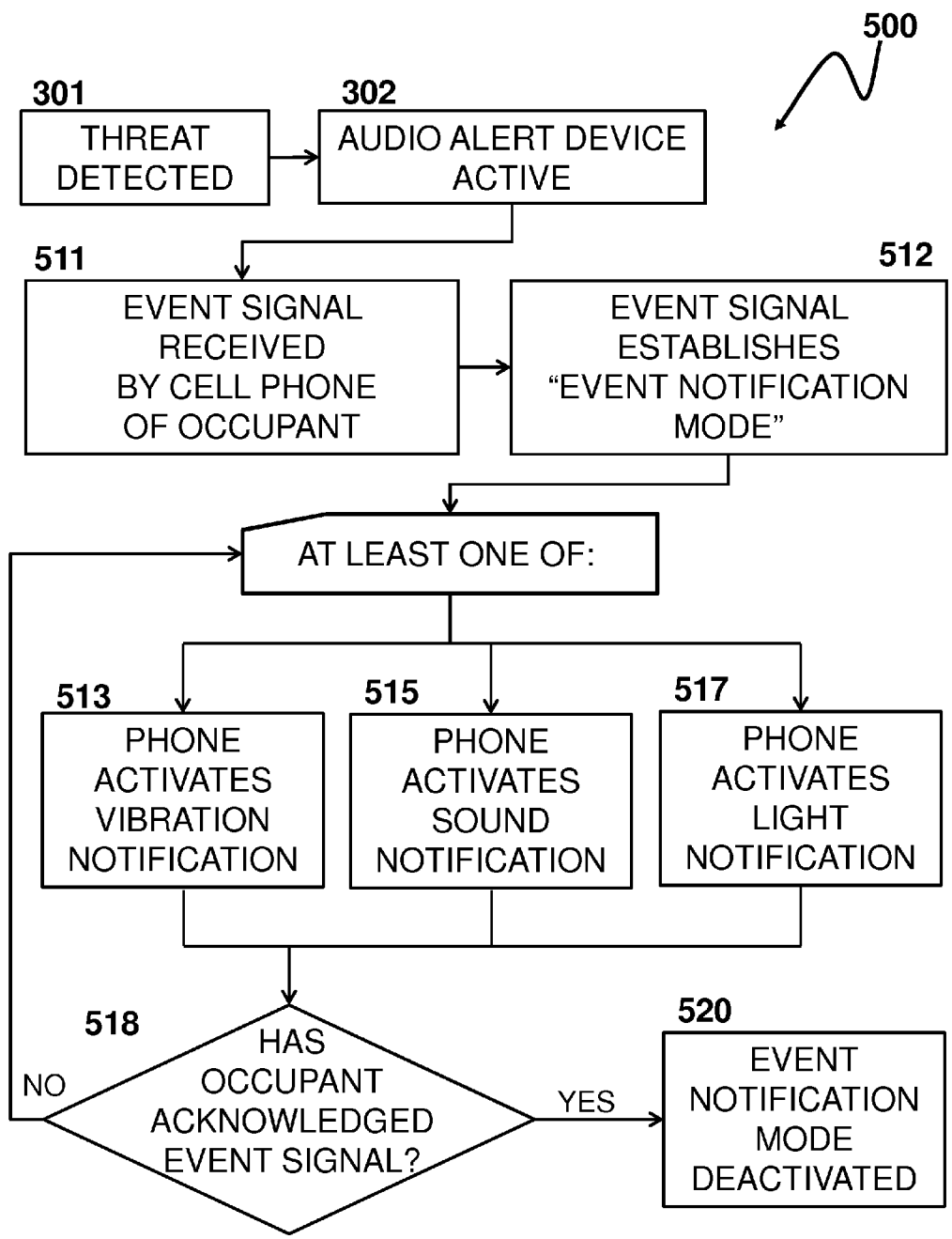
FIG. 5A is an exemplary flow diagram, which illustrates the steps taken to notify the human occupant of an event, when the present building occupant protection system is in an event notification mode.
Figure 5B:
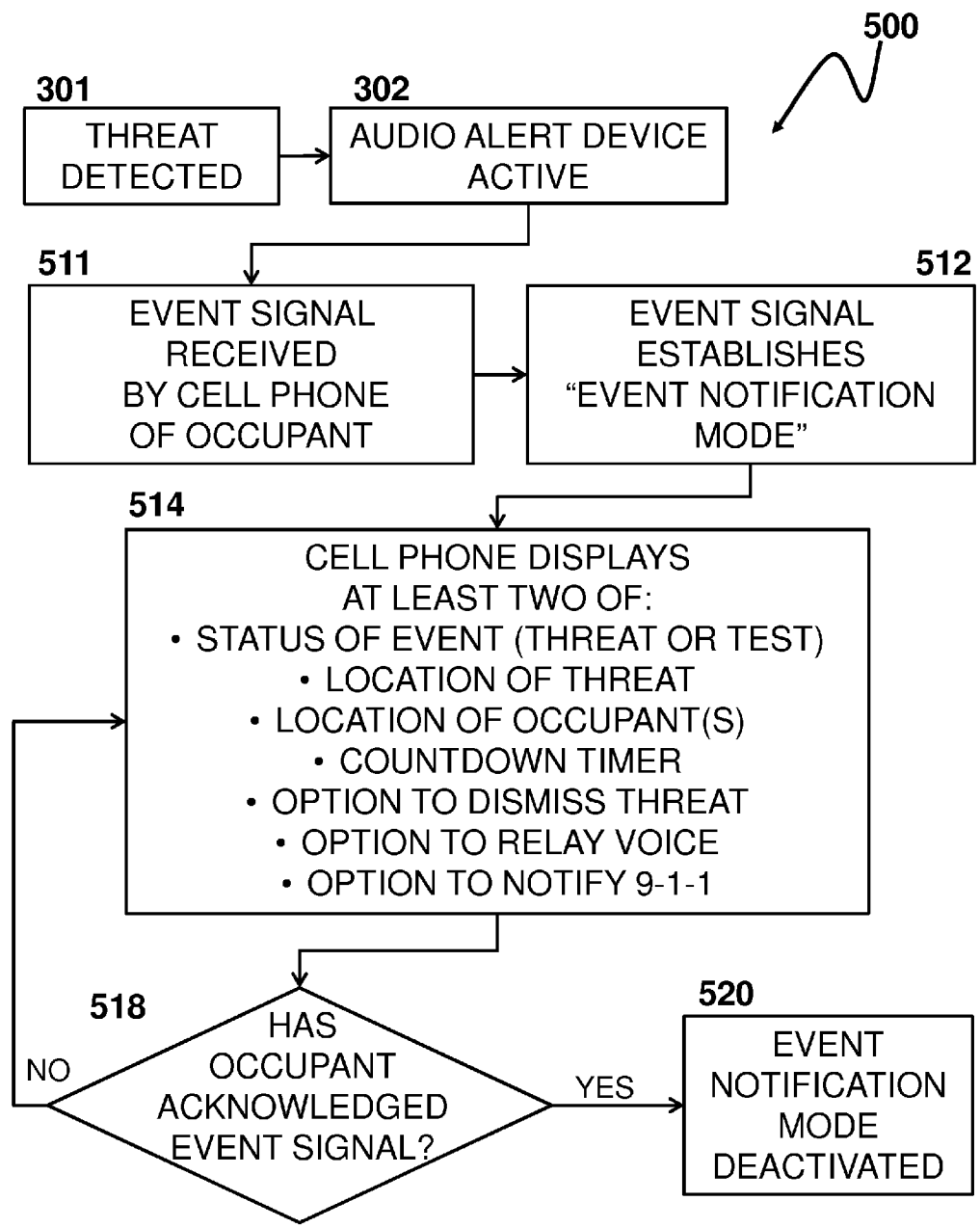
FIG. 5B is an exemplary flow diagram, which illustrates steps taken in addition to, or in place of, the steps of FIG. 5A to notify the human occupant of an event, when the present building occupant protection system is in the event notification mode.

FIGS. 5A and 5B are exemplary flow diagrams that illustrate a process 500 through which the building occupant protection system 200 is able to notify the human occupant 210 of an event through his mobile device 220, when the present building occupant protection system 200 is in an event notification mode.

With reference now to FIG. 5A, when the sensors 103 in the alarm unit 100 detect a threat (step 301), the controller 130 activates the audio alert device 105, and the audio alert device 105 produces a loud and recognizable sound (step 302). The controller 130 of the alarm unit 100 prompts the transceiver 110 to transmit an event signal to the mobile device 220 of the building occupant 210, thereby establishing the event notification mode (step 512) in an application on the mobile device 220 (e.g., cellular telephone) of the building occupant 210.

In the event notification mode, the cellular telephone 220 may take one or more of the following actions: (1) the telephone may vibrate (step 513); (2) the telephone may produce a unique sound (step 515); and (3) the telephone may display a unique light color or light sequence (step 517). The building occupant 210 may customize the type(s) of notification best suited for his needs or preferences. For instance, a person who is blind or who has poor vision may opt for a vibration indicator and/or a sound indicator. Alternately, a person who is deaf may choose a vibration indicator and/or a light indicator (e.g., a flashing light or lights of different colors).

The event notification indicators 513, 515, 517 continue until the building occupant 210 acknowledges the event signal (step 518). The event signal may be acknowledged by the building occupant 210 by interaction with the cellular telephone application. For example, the building occupant 210 may depress a button on the telephone, swipe the telephone screen with his finger, permit the telephone to scan his fingerprint, enter an unlock code, or any other means that indicates the immediate affiliation of the telephone 220 with the building occupant 210. Once acknowledged, the event notification mode is deactivated (step 520). As long as the alarm unit 100 senses a threat, the event notification mode continues until the building occupant 210 acknowledges the threat.

FIG. 5B provides an alternate or additional step (step 514) that may be part of the event notification mode. As before, when one or more sensors 103 detect a threat (step 301) above a threshold level, the controller 130 of the alarm unit 100 activates the audio alert device 105 (step 302) and prompts the transceiver 110 to send an event signal to the mobile device(s) 220, 4 in range of the signal. The mobile device(s) 220 typically include cellular telephones, but should be understood to include tablets, smart watches, computers, and the like. For ease of discussion, the mobile device 220 will be referred to as a cellular telephone.

The cellular telephone 220 of the building occupant 210 receives the event signal from the transceiver 110 of the alarm unit 100 (step 511), and the device 220 enters the event notification mode (step 512). As described above, the event notification mode may be communicated via an application on the device 220. Alternately, the event notification mode may be communicated by an SMS or MMS text message or an e-mail message, which includes links that the building occupant 210 may click to respond.

In the event notification mode, an application in the cellular telephone 220 creates a visual display of information. The display may include at least two of: the status of the event (threat or system test); the location of the threat; the location of the building occupant(s) 210, 260; a timer countdown, which indicates the time remaining to disable the alarm unit; an option to dismiss the threat; an option to relay the voice of the building occupant 210, as described with reference to FIG. 3; and an option to contact emergency services 250. The event notification communication may be acknowledged by the building occupant 210 (step 518), for example, by depressing a button on the telephone (which may correspond to one of the options listed above), by swiping the telephone screen with his finger, by permitting the telephone to scan his fingerprint, by entering an unlock code, or by any other means that indicates the affiliation of the telephone 220 with the building occupant 210. Once acknowledged, the event notification mode is deactivated (step 520).

FIG. 6A is an exemplary flow diagrams that illustrate a process 600 through which the building occupant protection system 200 is able to determine the likelihood of a device being affiliated with the human occupant during the event notification mode. FIG. 6B is an exemplary flow diagram that illustrates a process 650 through which the building occupant protection system 200 is able to determine the likelihood of a device 4 being affiliated with a pet 260 during the event notification mode. In both instances, the objective of these processes 600, 650 is to determine which occupants 210, 260 are present in the building during the event and to leverage the interaction between their associated devices 220, 4 and the alarm unit(s) 100 to pinpoint the location of the building occupants 210, 260 within the building.

With reference now to FIG. 6A, an event signal from the transceiver 110 of the alarm unit 100 is received by a remote device 220, such as the cellular telephone of the building occupant 210 (step 511). The receipt of the event signal establishes the event notification mode in the cellular telephone 220 (step 512). The event notification mode may activate certain sensors, applications, or features of the cellular telephone 220, such as those used in determining the location, the angular position, the lateral acceleration, and the rotation vector of the device; those used to provide gravity sensor data, lateral accelerometer data, and gyroscope data; and those used to measure movement, such as step detectors and step counters, any of which may be useful in ascertaining whether the cellular telephone 220 is in the possession of the building occupant 210.

The actions of the controller 130 of the alarm unit 100 are predicated on whether the transceiver 110 of the alarm unit 100 receives a response signal from one or more building occupants 210. When the building occupant 210 acknowledges the event signal (step 518), as discussed above with reference to FIGS. 5A and 5B, and the cellular telephone 220 transmits a response signal (step 612), the controller 130 recognizes that the responding device (e.g., the cellular telephone 220) is associated with a building occupant 210 (step 602).

In some instances, the event signal may not be acknowledged promptly (step 518). For example, the cellular telephone 220 may be in a different room from the building occupant; the building occupant may not be present in the building; or the building occupant may be unable to respond to the event signal. In these types of instances, when the event signal is not acknowledged, the controller 130 begins a series of checks to assess the likelihood that the mobile device 220 is affiliated with a building occupant 210 within the building.

One possible check involves the controller 130 transmitting a signal to the cellular telephone 220 to determine if the cellular telephone 220 is charging (step 604). It may be expected that the cellular telephone 220 is in the possession of the building occupant 210, when the cellular telephone 220 is not charging, and, conversely, that the cellular telephone is not in the possession of (or affiliated with) the building occupant 210, when the cellular telephone is charging.

A second possible check involves a determination of whether the cellular telephone 220 is lying flat (step 606). It may be expected that the cellular telephone 220 that is lying flat is not in the possession of (or affiliated with) the building occupant 210. For instance, the cellular telephone 220 may be lying on a table in one room, while the building occupant 210 is in another room or is outside the building. If the cellular telephone 220 is not lying flat, it may be more likely that the device 220 is associated with a building occupant 210 (step 602).

Another check involves the controller 130 determining if there are any indications that the cellular telephone 220 has been moved since the event signal (step 608). The indicators of movement may include, but are not necessarily limited to, changes in time-distance arrival of signal, triangulation using multiple devices or alarm units, trilateration, received signal strength indicators (RSSI), radio-frequency (RF) fingerprinting, GPS positioning, the location of the device, the angular position of the device, the lateral acceleration of the device, and the rotation vector of the device, gravity sensor data, lateral accelerometer data, and gyroscope data, step detectors, and step counters.

It stands to reason that, if the cellular telephone 220 has been moved or is moving, the building occupant 210 is likely in possession of the cellular telephone 220. In such case, the cellular telephone 220 transmits a response signal (step 612), and the controller 130 in the alarm unit 100 recognizes the response signal as being indicative of the telephone 200 being in the possession of, or affiliated with, the building occupant 210 (step 602).

Any combination of the above factors may provide data that allows the controller 130 to determine the likelihood the device 220 is associated with a building occupant 210. In a preferred embodiment, the determinations of device location and likelihood that device is associated with a human are included in the situation report broadcast by the communication device (step 407 of FIG. 4B). Optionally, this information may be transmitted in a communication 251 to emergency services 250 and to any and all mobile devices 220 or remote stations 230, to assist in efforts to locate the building occupants 210 during an emergency. In another embodiment, the likelihood that a device 220 is associated with a human occupant 210 is transmitted to emergency services 250, only if the alarm 200 is not dismissed.

FIG. 6B is an exemplary flow diagram that illustrates a process 650 through which the building occupant protection system 200 is able to determine the likelihood of a device 4 being affiliated with a pet 260 during the event notification mode. An event signal from the transceiver 110 of the alarm unit 100 is received by a remote device 4, such as the collar command unit 4 of the pet 260 (step 661). The receipt of the event signal establishes the event mode in the collar command unit 4 (step 663). In a preferred embodiment, the collar command unit 4 transmits a response signal (step 662), and the collar command unit 4 is automatically associated with a pet 260 (step 674).

In some instances, the controller 10 of the collar command unit 4 may receive an indicator from a bark detector 6 that the pet 260 has made some vocalization, in which case the collar command unit 4 is properly associated with the pet 260. Another possible check to determine if the collar command unit 4 is being worn by the pet 260 at the time of the event involves the controller 130 determining if there are any indications that the collar command unit 4 has been moved since the event signal (step 672). The indicators of movement may include, but are not necessarily limited to, changes in time-distance arrival of signal, triangulation using multiple devices or alarm units, trilateration, received signal strength indicators (RSSI), radio-frequency (RF) fingerprinting, GPS positioning, the location of the device, the angular position of the device, the lateral acceleration of the device, and the rotation vector of the device, gravity sensor data, lateral accelerometer data, and gyroscope data, step detectors, and step counters.

It stands to reason that, if the collar command unit 4 has been moved or is moving, the pet 260 is likely wearing the collar command unit 4. In such case, the collar command unit 4 transmits a response signal (step 662), and the controller 130 in the alarm unit 100 recognizes the response signal as being indicative of the collar command unit 4 being worn by, or affiliated with, the pet 260 (step 674).

Conversely, if the controller 130 receives no signals of vocalization (step 670) or movement (step 672), the controller 130 may determine that there is a low likelihood that the collar command unit 4 is being worn by the pet 260 (step 676) and, therefore, not include the pet 260 among the building occupants 210, 260 included in the situation report.

FIG. 7A is an exemplary flow diagram, which illustrates a process 700 through which the building occupant protection system 200 automatically summons emergency services personnel. FIG. 7B is an exemplary flow diagram, which illustrates a process 750 through which the building occupant protection system 200 automatically summons emergency services, even after the human occupant 210 has activated an override function.

As before, when one or more sensors 103 detect a threat (step 701) above a threshold level, the controller 130 of the alarm unit 100 activates the audio alert device 105 (not shown in FIGS. 7A and 7B). The building occupant 210 has the option of dismissing the threat, in response to the event notification communication, as described with reference to FIG. 5B. When the threat is dismissed, the timer 108 functions as an override timer to measure a prescribed period of time. The override timer permits the building occupant 210 to evaluate the severity of the threat and to prevent summoning emergency services 250 to address nuisance alarms (e.g., burned toast in a toaster oven).

If the override function in the timer 108 has not been activated (step 703), the event notification mode is established (step 712) with the mobile device 220 of the building occupant 210. That is, the controller 130 prompts the transceiver 110 to send an event signal to the mobile device(s) 220 in range of the signal. The controller 130 determines if the sensor(s) 103 are detecting the threat for the first time (step 714) (that is, whether the threat is a new threat or whether the sensors 103 are responding to a previously detected threat). When the controller 130 determines that the threat is newly detected, the controller 130 completes at least one of the following actions: using a temperature sensor 103 to take a baseline temperature measurement; using a smoke sensor 103 to take a baseline smoke reading; and activating the timer 108 for a baseline period (step 716).

When the controller 130 determines that the sensors 103 are responding to a threat that has previously been detected, the controller 130 completes one or more of the following actions: determining whether the baseline timer has expired; using the temperature sensor 103 to take a second temperature measurement and then comparing the second temperature measurement to the baseline temperature measurement; and using the temperature sensor 103 to take a second temperature measurement and then comparing the second temperature measurement to a predefined maximum temperature limit (step 718). The comparison of the second temperature measurement to the baseline temperature measurement may lead to a conclusion about whether the threat (e.g., fire) has spread.

If none of the above events has occurred—that is, if the baseline timer has not expired; the delta between the second temperature measurement and the baseline temperature measurement is small; and the second temperature measurement is below a defined maximum value—then the controller 130 continues to monitor the situation, and, if applicable, to detect the threat (step 701). However, if one of the events has occurred—that is, the baseline timer has expired, or the delta between the second temperature measurement and the baseline temperature measurement is large, or the second temperature measurement exceeds a defined maximum value—then the controller 130 activates the communication circuit 120 to send a report to emergency service providers (step 751), thereby summoning their assistance.

FIG. 7B illustrates a process 750 through which the building occupant protection system 200 automatically summons emergency services, even after the human occupant 210 has activated an override function. In this embodiment, the sensors 103 detect a threat above a certain threshold level (step 701). As described with reference to FIG. 5B, the building occupant 210 has the option of dismissing the threat, thereby activating the override timer 108 (step 703). If the building occupant 210 does not dismiss the threat, the override function of the timer 108 remains inactive (step 763).

However, when the building occupant 210 activates the override feature of the timer 108 (step 703), the controller 130 determines if the activation of the override feature is occurring for the first time (step 754). When the controller 130 determines that the override feature is newly activated, the controller 130 completes at least one of the following actions: using a temperature sensor 103 to take an override temperature measurement; using a smoke sensor 103 to take an override smoke reading; and activating the timer 108 for an override period (step 756).

When the controller 130 determines that the override feature of the timer 108 has previously been activated, the controller 130 completes one or more of the following actions: determining whether the override timer has expired; determining whether a second sensor 103 has detected the threat; using the temperature sensor 103 to take an additional temperature measurement and then comparing the additional temperature measurement to the baseline temperature measurement; using the temperature sensor 103 to take an additional temperature measurement and then comparing the additional temperature measurement to the override temperature measurement; using the temperature sensor 103 to take an additional temperature measurement and then comparing the additional temperature measurement to a pre-defined maximum temperature limit (step 758). The comparison of the additional temperature measurement to the baseline temperature measurement and/or the override temperature measurement may lead to a conclusion about whether the threat (e.g., fire) has spread. The detection of the threat by a second sensor includes a situation where a second sensor in the same alarm unit 100 senses a threat (e.g., the smoke sensor detects a threat, as well as the fire sensor), in addition to a situation where a sensor 103 in a different alarm unit 100 senses the threat (e.g., a sensor 103 in an alarm unit 100 in another room).

If none of the above events has occurred—that is, if the override timer has not expired; a second sensor 103 has not detected the threat; the delta between the additional temperature measurement and the baseline temperature measurement is small; the delta between the additional temperature measurement and the override temperature measurement is small; and the additional temperature measurement is below a defined maximum value—then the override timer remains activated (step 759).

However, if one of the events has occurred—that is, the override timer has expired, or a second sensor 103 has detected a threat, or the delta between the additional temperature measurement and the baseline temperature measurement is large, or the delta between the additional temperature measurement and the override temperature measurement is large, or the additional temperature measurement exceeds a defined maximum value—then the controller 130 deactivates the override feature of the timer 108 and directs the communication circuit 120 to send a report to emergency service providers (step 751 of FIG. 7A), thereby summoning their assistance.

The building occupant 210 needs to have confidence in the ability of the building occupant protection system 200 to function properly during an emergency. Unlike conventional alarm units that require bi-annual battery changes and manual testing, the building occupant protection system 200, described herein, is configured to perform periodic self-testing to ensure that its components are in working order. To that end, FIG. 8A is an exemplary flow diagram, which illustrates a process 800 through which the building occupant protection system 200 engages in a self-test, and FIG. 8B is an exemplary flow diagram, which illustrates an additional process 850 performed by the building occupant protection system 200 during the self-test.

Figure 8A:
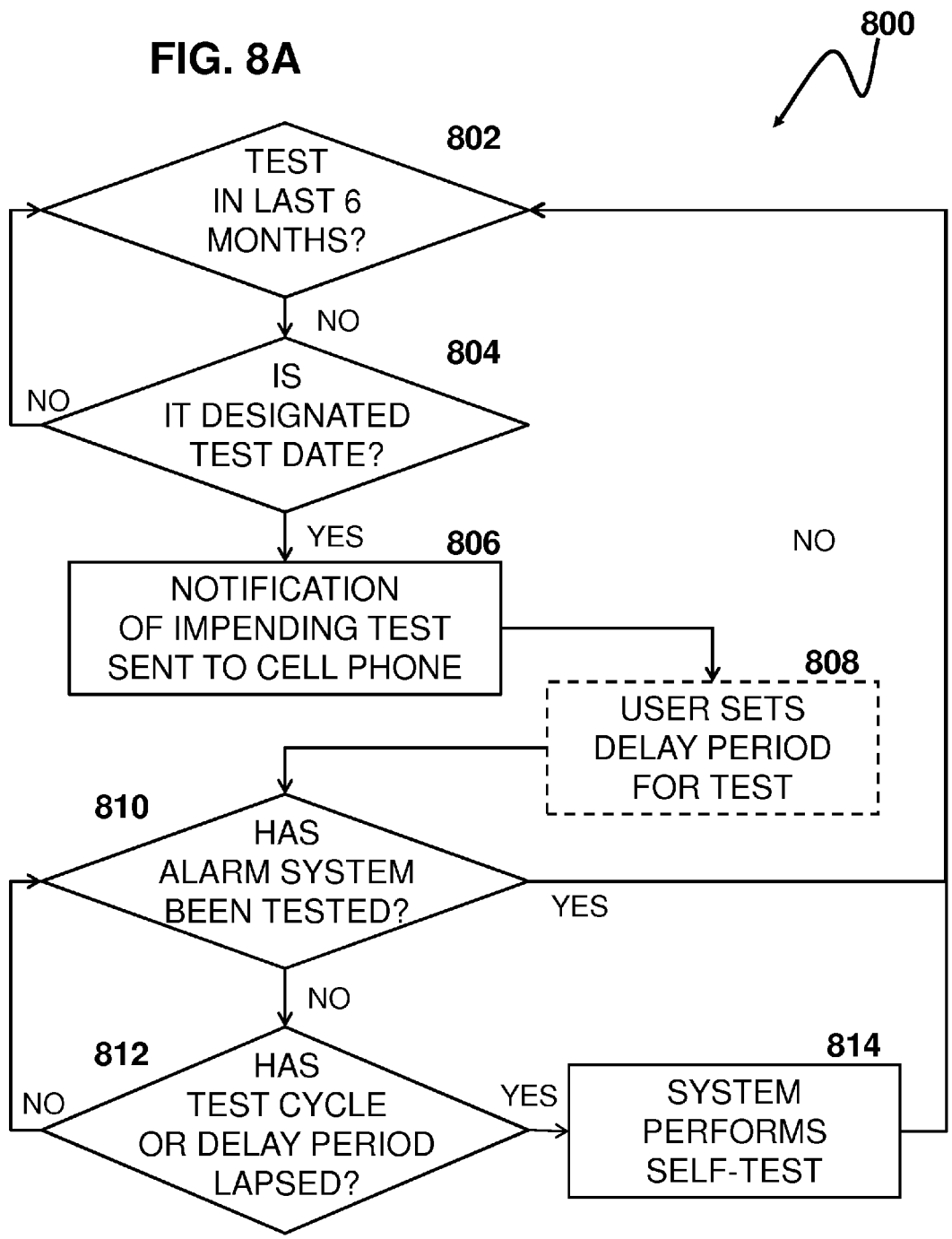
FIG. 8A is an exemplary flow diagram, which illustrates the steps taken by the present building occupant protection system to engage in a self-test.

With reference now to FIG. 8A, the timer mechanism 108 in the alarm unit 100 measures a pre-defined or user-defined period of time between system tests (e.g., a six-month period). Alternately, or in addition, the timer mechanism 108 may be set to conduct a system test on a designated date (e.g., January 15 and July 15). The timer mechanism 108 may be connected, via the transceiver 110 or a wired connection, to the internet, where the timer mechanism 108 may be synchronized to an international clock. Alternately, the time mechanism 108 may be a real-time clock capable of tracking time and dates.

The timer mechanism 108 keeps track of the timing since the last system test, for example, whether a system test has occurred in the past six months or other designated period (step 802). If the test has not occurred in the past six months, the timer mechanism 108 determines whether the actual date corresponds to the designated test date (step 804).

When the actual date is 24 hours ahead of the designated test date, the controller 130 prompts the transceiver 110 to transmit an impending test notification to the mobile device 220 of the building occupant 210, preferably using a BLUETOOTH® or Wi-Fi connection (step 806). The impending test notification is received by the mobile device 220 (e.g., cellular telephone) of the building occupant 210 and is displayed through an application on the device 220, along with choices for a response.

The building occupant 210 has the option to initiate a delay in the start time and/or date of the system test (step 808) by clicking on a delay button or link and setting a preferred time and/or date for the system test (leading to a "no" response in step 810). For instance, the building occupant 210 may choose to have the system test conducted during hours when the building occupant 210 is expected to be away from the home (e.g., at work). The ability to delay the test to a more convenient time prevents the building occupant 210 from being interrupted during a pleasant or important life activity, such as during the viewing of a favorite television program or during a time when the building occupant 210 is sleeping. Alternately, the building occupant 210 may also elect to conduct the system test immediately (leading to a "yes" response in step 810) by clicking another button or link in the application.

The controller 130 then monitors to determine whether the system 200 has been tested (step 810). If the building occupant 210 initiated an immediate test, the system performs a self-test, and the timer mechanism 108 resets for another prescribed period, such as six months. If the building occupant 210 has not responded to the impending test notification or has set a delay period for the system test, the controller 130 leverages the timer mechanism 108 to determine when the pre-defined test cycle or delay period has lapsed (step 812). When the test cycle, and any optional delay period, has lapsed, the system 200 initiates a self-test (step 814), as described in FIG. 8B.

FIG. 8B illustrates the process 850 by which the building occupant protection system 200 conducts a self-test. When the system test is in progress (step 852), the controller 130 takes steps to ensure that secure test settings are established (step 854).

The controller 130 of one or more of the alarm units 100 begins testing the various components of the alarm unit 100. In a preferred embodiment, the testing includes a temperature sensor comparison (step 856), an audio alert device test (step 858), and a communication device test (step 860). Although not required, the alarm units 100 of the building occupant protection system 200 may be tested individually and sequentially to ensure that each alarm unit 100 is functioning properly and that sounds from the audio alert device 105 or communication device 107 of a first alarm unit 100 are not interpreted as sounds from a neighboring alarm unit, thus creating a false positive test result.

In the temperature sensor comparison (step 856), measurements from the temperature sensors 103 within a single alarm unit 100 may be compared with one another or with measurements from the temperature sensors 103 from other alarm units 100. The comparison may be made by the controller 130, or the measurements from each alarm unit 100 or sensor 103 may be communicated, via the communication circuit 120, to an internet cloud-based computer network 230 for comparison.

A failed test may be characterized by one of the following exemplary conditions: when the measurements from the temperature sensors 103 are substantially different from one another; when the measurements from the temperature sensors 103 are more than 15% different from one another; when the measurements from the temperature sensors 103 are more than 10% different from one another; when the measurements from the temperature sensors 103 are more than 5% different from one another; when the measurements from the temperature sensors 103 are more than 3% different from one another; when the measurements from the temperature sensors 103 are more than 1% different from one another; when the measurements from the temperature sensors 103 are more than 10 degrees (° F.) different from one another; when the measurements from the temperature sensors 103 are more than 5 degrees (° F.) different from one another; when the measurements from the temperature sensors 103 are more than 3 degrees (° F.) different from one another; when the measurements from the temperature sensors 103 are more than 1 degree (° F.) different from one another. In the event of a failed test in the temperature sensor comparison (step 856), the controller 130 prompts the transceiver 110 to communicate an error message to the mobile device 220 of the building occupant 210 (step 890, not shown separately for the temperature sensor comparison).

In the audio alert device test, the audio alert device 105 is activated, thereby producing a recognizable loud sound. If the audio alert device 105 is functioning properly, a microphone (noise sensor) 103 in the alarm unit 100 detects the sound from the audio alert device 105 (step 866). If the microphone does not detect the sound from the audio alert device 105, the controller 130 prompts the transceiver 110 to communicate an error message to the mobile device 220 of the building occupant 210 (step 890). If the microphone does detect the sound from the audio alert device 105, the controller 130 prompts the transceiver 110 to communicate a "successful test" message to the mobile device 220 of the building occupant 210 (step 880).

Another feature evaluated during the system test is the ability of the communication device 107 to produce or play an audio file containing a vocal announcement (step 860). The controller 130 prompts the communication device 107 to produce or play the audio file. The audio file may be pre-loaded onto the controller 130 (or memory card) or may be loaded by the building occupant 210 or may be downloaded from the internet, via the communication circuit 120.

If the communication device 107 is functioning properly, a microphone (noise sensor) 103 in the alarm unit 100 detects the sound from the communication device 107 (step 866). If the microphone does not detect the sound from the communication device 107, the controller 130 prompts the transceiver 110 to communicate an error message to the mobile device 220 of the building occupant 210 (step 890).

If the microphone does detect the sound from the communication device 107, the controller 130 may optionally direct the communication device 107 to broadcast a promotional message supplied by a vendor (step 872). If the optional promotional message is broadcast, the controller 130 may direct a memory card in the alarm unit 100 to record the broadcast or other pertinent information or may "stream" the recording to a remote station 230 via the communication circuit 120 (step 874), as discussed further with reference to FIG. 9. When the sound of the communication device 107 is detected, the controller 130 prompts the transceiver 110 to communicate a "successful test" message to the mobile device 220 of the building occupant 210 (step 880). Once the three parts of the system test are successfully completed, the timer mechanism 108 is reset.

It should be noted that a single error message or a single successful test message, as opposed to three individual messages, may be transmitted to the mobile device 220 of the building occupant 210. The successful test message may include information regarding the status of the test (i.e., successful), the time of the test, the date of the test, and the projected date of the next test. In one embodiment, the unsuccessful completion of a single test (856, 858, 860) is sufficient to produce an error message. The error message may include various diagnostics of the test, including which portions of the test were unsuccessfully completed.

The error message may be accompanied by an intermittent audible tone, which is produced by either the audio alert device 105 or the communication device 107 (whichever device did not experience an unsuccessful test). When an unsuccessful test occurs, the controller 130 may activate one or more of the lights 106 (e.g., a red LED light) in the alarm unit 110 as a visible indicator to the building occupant 210. The intermittent audible tone and/or the light remain active until the alarm unit 100 is retested successfully.

Further, it should be noted that error messages and successful test messages may additionally be transmitted, via the communication circuit 120, to a remote station, such as a cloud-based computer network 230 or a third-party monitoring company 240. These remote stations may maintain operational and test records of the building occupant protection system 200.

It is also contemplated herein that the building occupant 210 may choose to conduct a system test on an unscheduled basis. In this case, the building occupant 210 functions as the noise sensor 103 that detects the sounds from the audio alert device 105 and the communication device 107. Accordingly, the manual system test may only require a temperature sensor comparison (step 856). When the manual test is completed, the controller 130 prompts the transceiver 110 to communicate a "successful test" message to the mobile device 220 of the building occupant 210 (step 880), and the timer mechanism 108 is reset.

FIG. 9 is an exemplary flow diagram, which illustrates a process 900 through which an alarm service supplier of the present building occupant protection system is able to generate additional revenue via promotional messages played in conjunction with the system test of FIG. 8B.

It may be desirable for the alarm service provider (i.e., the manufacturer, distributor, or third-party monitoring service) to sell advertising time as part of the system test to maximize revenue and/or to reduce the cost of the system 200 to the building occupant 210. In this instance, an advertiser ("Company Y") purchases promotional coupons, or ad time, from the alarm service provider ("Company X") (step 902) to promote a business, person, product, or event. The advertising company (Company Y) supplies one or more audio files for the promotional spots to the alarm service provider (Company X) (step 904). Company X may store the audio files on a remote station 230, such as a database or computer network, where they may be accessed by or provided to the communication circuit 120 of the alarm unit 100. Along with the audio files, Company X maintains a record of how many promotional coupons Company Y has purchased, how many times each promotional spot has been played, and which audio files (promotional spots) have been broadcast.

The controller 130 monitors the alarm unit 100 and periodically initiates a system test, as described previously. Alternately, the building occupant 210 may manually initiate a system test. Upon successful completion of the system test (step 906) (whether automatic or manual), the controller 130 prompts the communication circuit 120 to connect to the database or computer network 230 where the audio files are stored. The computer network 230 determines if promotional coupons are remaining for the promotional spots (step 908) and, if so, provides at least one audio file to the alarm unit 100, via the communication circuit 120. Said differently, the computer network 230 determines whether Company Y has exhausted the purchased ad time for the playing of its audio file.

If promotional coupons are available and the computer network 230 has provided at least one audio file, the controller 130 prompts the communication device 107 to play the audio file(s) through the alarm units 100. The audio file does not have to be downloaded onto, or stored on, the alarm unit 100. As discussed above, the communication circuit 120 can leverage its internet connection to stream the audio file from the computer network 230 through the communication device 107.

As mentioned above, the building occupant protection system 200 creates a record of the broadcast of the promotional spots, including, but not necessarily limited to, the date of the system test, the time of the system test, the location of the system test, the audio file played, the number of building occupants 210 in the range of the alarm units 100, the signal strength of the devices 220 associated with the building occupants 210 in the range of the alarm units 100, the test activation method, the results of the system test, and the number of promotional coupons remaining (step 974). The promotional message information record may be stored temporarily in a memory card or other memory device of the alarm unit 100 before being transmitted, via the communication circuit 120, to the computer network 230. Alternately, the promotional message information record may be transmitted in real-time by streaming the information to the computer network 230. At some frequency, Company X may then provide Company Y with record data for their review (step 976).

Another variation of this approach (not illustrated) involves replacing the broadcast of the promotional message (step 972) with the transmission of the promotional message to the mobile device 220 associated with the building occupant 210, for example, as a text message, an e-mail link, or the like.

FIG. 10 is an exemplary flow diagram, which illustrates a process 1000 by which the human occupant 210 utilizes the present building occupant protection system 200 as a secondary wake-up system.

The capability of the present building occupant protection system 200 to broadcast an audible cue, an audio file, or a vocal annunciation in various circumstances has been discussed herein. In addition to the primary functionality of the system 200 in protecting the building occupants 210, this capability may be put to other uses, including use as a secondary wake-up alarm. The very loud (75 to 90 dBA) nature of the audio alert device 105 makes it unlikely that a building occupant 210 will sleep through the signal produced by the audio alert device 105.

The alarm unit 100 may be used in conjunction with, or as a supplemental back-up to, an alarm feature on the mobile device 220 of the building occupant 210. The building occupant 210 uses an application on his mobile device 220 to engage the system 200 as a secondary wake-up system (step 1002). The building occupant 210 engages the clock function on his mobile device 220 as the primary wake-up device. The timer mechanism 108 of the alarm unit 100, as well as the clock function of the mobile device 220, determines when it is the occupant-set wake-up time (step 1004). At this designated time, the mobile device 220 activates its clock alarm as the primary wake-up device (step 1006), and a timer function associated with the mobile device 220 is activated (step 1008).

When the primary wake-up device (e.g., the cellular telephone) 220 of the building occupant 210 receives a confirmation from the building occupant 210 that he is awake—for instance, if the building occupant 210 turns off the primary wake-up device 220 or sets a snooze feature—the building occupant protection system 200 is not activated as a secondary wake-up device (step 1012). An application used to set the system 200 as the secondary wake-up device deactivates the system 200, when the building occupant 210 interacts with his mobile device 220, thereby indicating that he is awake.

Alternately, if the primary wake-up device 220 does not receive a confirmation from the building occupant 210 that he is awake, the timer function of the primary wake-up device 200 continues its countdown period. When the time expires (step 1014), the audio alert device 105 and/or the communication device 107 of the alarm unit 100 is activated (step 1016). The very loud sound from the alarm unit 100 is certain to wake even the deepest sleepers. After a short period (such as 30 seconds, as measured by the timer 108 of the alarm unit), the audio alert device 105 is deactivated.

When the audio alert device 105 and/or the communication device 107 are activated, the controller 130 recognizes the activation as a test. Accordingly, the controller 130 may conduct a temperature sensor comparison (as described above) and, if the temperature sensor comparison test is unsuccessful, the controller 130 prompts the communication circuit 120 to deliver an error message to the mobile device 220 of the building occupant 210.

In another embodiment, when a threat is sensed, the controller 130 may activate an enabled HVAC system (i.e., remote station 230). The building occupant 210 may select a desired temperature for a room in which the alarm unit 100 is located (or the building occupant 210 may select a desired temperature for the building in which multiple alarm units 100 are located). The sensor 103 detects the temperature in the room in which a particular alarm unit 100 is installed, and the controller 130 manages the opening and/or closing of enabled HVAC vents to achieve the temperature selected by the building occupant 210.

In another embodiment, when a threat is detected, the sensor 103 may detect the oxygen content in a room. In a fire 202, if the oxygen content decreases to a dangerous level, the controller 130 may activate the HVAC system to direct air flow into the room to prevent a backdraft from developing. In a related aspect, the controller 130 may detect the presence of a building occupant in a particular room and activate the HVAC system to direct air flow to that particular room, while reducing or eliminating air flow to other rooms.

The preceding discussion merely illustrates the principles of the present building occupant protection system and its method of operation. It will be appreciated that those skilled in the art may be able to devise various arrangements, which, although not explicitly described or shown herein, embody the principles of the inventions and are included within their spirit and scope. Furthermore, all examples and conditional language recited herein are principally and expressly intended to be for educational purposes and to aid the reader in understanding the principles of the inventions and the concepts contributed by the inventor to furthering the art and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Terms such as "first", "second", and the like are intended only to aid in the reader's understanding of the drawings and are not to be construed as limiting the invention being described to any particular orientation or configuration, unless recited in the claims.

This description of the exemplary embodiments is intended to be read in connection with the figures of the accompanying drawings, which are to be considered part of the entire description of the invention. The foregoing description provides a teaching of the subject matter of the appended claims, including the best mode known at the time of filing, but is in no way intended to preclude foreseeable variations contemplated by those of skill in the art.

What is claimed is:

1. An integrated building occupant protection system for protecting occupants of a building, the protection system comprising:
    a plurality of interconnected alarm units, each alarm unit being located in a different area of the building;
    each alarm unit comprising: a controller; and, coupled to the controller, a threat sensor to detect a threat, a timer, an audio alert device, a communication device, and at least one noise sensor to detect sound from the audio alert device and the communication device;
    wherein the protection system conducts a self-test, the self-test including one or more of the following actions: (i) at least two threat sensors are prompted by the controller to measure the temperature in respective areas of the building, the temperatures measured by the at least two threat sensors being compared with each other; (ii) the audio alert device is activated by the controller; and (iii) the communication device is activated by the controller; and
    wherein the controller recognizes action (i) as successful based on the temperatures measured by the at least two threat sensors being within 15% of each other; and action (ii) as successful based on the at least one noise sensor detecting sound from the audio alert device; and action (iii) as successful based on the at least one noise sensor detecting sound from the communication device; and
    wherein the controller resets the timer for a prescribed period until a next self-test.

2. The protection system of claim 1, wherein the controller recognizes action (i) as successful if the temperatures measured by the at least two threat sensors are within 15% of each other.

3. The protection system of claim 1, wherein the at least two threat sensors are located in different alarm units in different areas of the building, each threat sensor being prompted by a respective controller.

4. The protection system of claim 1, wherein the audio alert device is one of a speaker, a siren, and a piezoelectric device; and wherein the audio alert device produces a sound having a volume of at least about 75 decibels.

5. The protection system of claim 1, wherein the controller recognizes action (ii) as successful if the at least one noise sensor detects sound from the audio alert device.

6. The protection system of claim 1, wherein the communication device comprises a transceiver portion and an associated speaker.

7. The protection system of claim 1, wherein the controller recognizes action (iii) as successful if the at least one noise sensor detects sound from the communication device.

8. The protection system of claim 1, wherein the communication device broadcasts a promotional message as part of the self-test or at a successful completion of the self-test.

9. A system for generating revenue using an integrated building occupant protection system for protecting occupants of a building, the system comprising:
    a computer network containing a record of promotional coupons purchased by a third party, a record of promotional coupons broadcast on behalf of the third party, and an audio file used in the broadcast for the third party;
    an integrated building occupant protection system comprising:
    a plurality of interconnected alarm units, each alarm unit being located in a different area of the building; each alarm unit comprising: a controller; and, coupled to the controller, a threat sensor to detect a threat, a timer, an audio alert device, a communication device, and a communication circuit;

wherein the building occupant protection system conducts a test, the test including one or more of the following actions: (i) at least two threat sensors are prompted by the controller to measure the temperature in respective areas of the building, the temperatures measured by the at least two threat sensors being compared with one another; (ii) the audio alert device is activated by the controller; and (iii) the communication device is activated by the controller; and wherein, upon successful completion of the test, (a) the controller queries the computer network to obtain the audio file; (b) the computer network determines if the record of promotional coupons purchased is greater than the record of promotional coupons broadcast, and, if so, provides the audio file to the alarm unit, via the communication circuit; and (c) the controller prompts the communication device to broadcast the provided audio file.

10. The protection system of claim 9, wherein the audio alert device is one of a speaker, a siren, and a piezoelectric device; and wherein the audio alert device produces a sound having a volume of at least about 75 decibels.

11. The protection system of claim 9, wherein each alarm unit further comprises at least one noise sensor; and wherein the controller recognizes action (ii) as successful if the at least one noise sensor detects sound from the audio alert device.

12. The protection system of claim 9, wherein the communication device comprises a transceiver portion and an associated speaker.

13. The protection system of claim 9, wherein each alarm unit further comprises at least one noise sensor; and wherein the controller recognizes action (iii) as successful if the at least one noise sensor detects sound from the communication device.

14. The protection system of claim 9, wherein each alarm unit further comprises at least one noise sensor; and wherein the controller recognizes action (i) as successful based on the temperatures measured by the at least two threat sensors being within 15% of each other; and action (ii) as successful based on the at least one noise sensor detecting sound from the audio alert device; and action (iii) as successful based on the at least one noise sensor detecting sound from the communication device; and wherein, upon successful completion of the test, the controller resets the timer for a prescribed period until a next self-test.

15. The system of claim 14, wherein a memory device is located within at least one of the alarm unit and a remote station; and wherein the controller prompts the memory device to record information about the promotional broadcast.

16. An integrated building occupant protection system for protecting occupants of a building, the protection system comprising:

a plurality of interconnected alarm units, each alarm unit being located in a different area of the building; each alarm unit comprising: a controller; and, coupled to the controller, a threat sensor to detect a threat, a timer, an audio alert device, and a communication device; and at least one device for locating the building occupants, the at least one locating device being in communication with at least one alarm unit of the plurality of interconnected alarm units;

wherein the controller activates the audio alert device when the threat sensor detects a threat; and wherein the communication device periodically interrupts the audio alert device to vocally broadcast a situation report including at least one of the type of threat sensed, a number of building occupants inside the building, the species of the building occupants, a location of each of the building occupants, and a countdown of time remaining in the period measured by the timer.

17. The protection system of claim 16, wherein the at least one device for locating the building occupants comprises a transceiver in at least one alarm unit for transmitting signals to and receiving signals from a mobile device associated with a building occupant;

wherein the building occupant is a human occupant, and wherein the mobile device associated with the building occupant is a cellular telephone having an application for receiving an event signal from the transceiver and for transmitting a response signal to the transceiver; and wherein the controller uses the response signal to determine the location of the human occupant.

18. The protection system of claim 17, wherein the cellular telephone application produces an event notification, the event notification being one or more of a text message, a displayed message, a vibration, an audible signal, and a flashing light, upon receipt of the signal from the alarm.

19. The protection system of claim 16, wherein the at least one device for locating the building occupants comprises a transceiver in at least one alarm unit for transmitting signals to and receiving signals from a mobile device associated with a building occupant;

wherein the building occupant is a pet, and the mobile device associated with the building occupant is a collar command unit, the collar command unit comprising a housing, a controller, a power supply, a receiver for receiving the event signal from the transceiver; and a transmitter for transmitting a response signal to the transceiver of the alarm unit; and wherein the controller uses the response signal to determine the location of the pet.

\* \* \* \* \*